US011972470B2

(12) United States Patent
Downey et al.

(10) Patent No.: US 11,972,470 B2
(45) Date of Patent: Apr. 30, 2024

(54) SYSTEMS AND METHODS FOR IDENTIFYING ITEM SUBSTITUTIONS

(71) Applicant: The Boston Consulting Group, Inc., Boston, MA (US)

(72) Inventors: Richard Downey, San Francisco, CA (US); Shirish Dhar, Boston, MA (US); Adam Whybrew, New South Whales (AU); Jurgen Hanekom, Andross (AU)

(73) Assignee: The Boston Consulting Group, Inc., Boston, MA (US)

( * ) Notice: Subject to any disclaimer, the term of this patent is extended or adjusted under 35 U.S.C. 154(b) by 0 days.

(21) Appl. No.: 18/128,148

(22) Filed: Mar. 29, 2023

(65) Prior Publication Data

US 2023/0306493 A1    Sep. 28, 2023

Related U.S. Application Data

(63) Continuation-in-part of application No. 17/806,385, filed on Jun. 10, 2022, now Pat. No. 11,669,882, which is a continuation-in-part of application No. 17/514,434, filed on Oct. 29, 2021, which is a continuation of application No. 17/015,863, filed on Sep. 9, 2020, now Pat. No. 11,321,763.

(60) Provisional application No. 63/362,351, filed on Apr. 1, 2022, provisional application No. 63/362,274, filed on Mar. 31, 2022, provisional application No. 63/003,527, filed on Apr. 1, 2020.

(51) Int. Cl.
*G06Q 30/00* (2023.01)
*G06F 18/214* (2023.01)
*G06N 3/08* (2023.01)
*G06Q 30/0283* (2023.01)
*G06Q 30/0601* (2023.01)

(52) U.S. Cl.
CPC ....... *G06Q 30/0631* (2013.01); *G06F 18/214* (2023.01); *G06N 3/08* (2013.01); *G06Q 30/0283* (2013.01); *G06Q 30/0633* (2013.01)

(58) Field of Classification Search
CPC .......... G06Q 30/0631; G06Q 30/0283; G06Q 30/0633; G06K 9/6256; G06N 3/08
See application file for complete search history.

(56) References Cited

U.S. PATENT DOCUMENTS

| | | |
|---|---|---|
| 10,103,953 B1 | 10/2018 | Chang et al. |
| 10,410,272 B1 | 9/2019 | Johnson et al. |
| 2003/0105682 A1* | 6/2003 | Dicker ............... G06Q 30/0253 705/26.8 |
| 2009/0228360 A1 | 9/2009 | Mancarella et al. |

(Continued)

OTHER PUBLICATIONS

Dziugaite, Gintare Karolina, and Daniel M. Roy. "Neural network matrix factorization." arXiv preprint arXiv:1511.06443 (Year: 2015).*

(Continued)

*Primary Examiner* — Matthew E Zimmerman
(74) *Attorney, Agent, or Firm* — DLA PIPER LLP (US)

(57) ABSTRACT

Systems and methods for identifying item substitutions. History information can be collected. The history information can be transformed into a matrix of observed substitutions. A neural network can be trained on the matrix of observed substitutions to generate item embeddings. A substitution similarity between the item and another item based on the item embeddings can be identified.

34 Claims, 27 Drawing Sheets

(56) References Cited

U.S. PATENT DOCUMENTS

| | | | |
|---|---|---|---|
| 2010/0324985 | A1 | 12/2010 | Kumar et al. |
| 2014/0278778 | A1 | 9/2014 | Regan |
| 2014/0358633 | A1 | 12/2014 | Wu et al. |
| 2014/0358665 | A1 | 12/2014 | Gopalsamy et al. |
| 2015/0339756 | A1* | 11/2015 | Konik ............... G06F 16/3325 705/26.7 |
| 2016/0125048 | A1 | 5/2016 | Hamada |
| 2016/0210674 | A1 | 7/2016 | Allen et al. |
| 2017/0185585 | A1 | 6/2017 | Applegate et al. |
| 2017/0185894 | A1 | 6/2017 | Volkovs et al. |
| 2019/0114362 | A1 | 4/2019 | Subbian et al. |
| 2019/0179915 | A1* | 6/2019 | Yoon .................... G06F 16/337 |
| 2019/0347607 | A1 | 11/2019 | Shi et al. |
| 2020/0043022 | A1* | 2/2020 | Karmakar ............. G06F 16/322 |
| 2020/0074517 | A1 | 3/2020 | Meier et al. |

OTHER PUBLICATIONS

Baskoro J.B., "Neural Network Embedding for SKU Representation in Mapan," Medium.com, May 21, 2019, 4 Pages, XP055924119, [Retrieved on Jul. 2, 2021] Retrieved from URL: https://medium.com/@jatmiko.budi/neural-network-embedding-for-sku-representation-in-mapan-c0bc20951b9e#:~:text=An%20embedding%2C%20is%20a%20method,representation%20of%20the%20categorical%20variable, (May 23, 2022).

Chen F., et al., "Prodcut2Vec: Understanding Product-Level Competition Using Representation Learning," NYU Stern School of Business, Jan. 14, 2020, 55 Pages.

Conneau A., et al., "Word Translation Without Parallel Data," ICLR Conference Paper 2018, arXiv preprint, arXiv:1710.04087, 2017, 14 Pages.

Data to Viz: "Dendrogram," 05 Pages, [Retrieved on Mar. 31, 2019] Retrieved From URL: https://web.archive.org/web/20190331174919/https://www.data-to-viz.com/graph/dendrogram.html.

Dziugaite G.K., et al., "Neural Network Matrix Factorization," Presented on ICLR 2016, arXiv preprint, arXiv:1511.06443, Dec. 15, 2015, 7 Pages.

U.S. Appl. No. 17/015,863.

U.S. Appl. No. 17/806,385.

International Preliminary Report on Patentability for International Application No. PCT/US2021/025078, dated Oct. 13, 2022, 10 Pages.

International Search Report and Written Opinion for International Application No. PCT/US2021/025078, dated Jun. 4, 2021, 11 Pages.

Le Q., et al., "Distributed Representations of Sentences and Documents," Proceedings of the 31st International Conference on Machine Learning, 2014, vol. 32, No. 2, 9 Pages.

Maaten L.V.D., et al., "Visualizing Data Using t-SNE," Journal of Machine Learning Research, vol. 9, Nov. 2008, pp. 2579-2605.

Mikolov T., et al., "Distributed Representations of Words and Phrases and their Compositionality," Advances in Neural Information Processing Systems, 2013, 9 Pages.

Mikolov T., et al., "Efficient Estimation of Word Representations in Vector Space," arXiv:1301.3781v3, Sep. 7, 2013, 12 Pages.

Shperber G., "A Gentle Introduction to Doc2Vec," Jul. 26, 2017, 10 Pages, [Retrieved on Jul. 1, 2021] Retrieved from URL: https://medium.com/wisio/a-gentle-introduction-to-doc2vec-db3e8c0cce5e.

Souza G.C., "Supply Chain Analytics," Business Horizons, 2014, vol. 57, No. 5, pp. 595-605.

Wikipedia: "Cluster Analysis," Wikipedia Article on Cluster Analysis, Aug. 20, 2020, 22 Pages, Retrieved from URL: https://en.wikipedia.org/w/index.php?title=Cluster_analysisoldid=1031035663.

Wikipedia: "Machine Learning," A Wikipedia Article, Aug. 18, 2020, 25 Pages, Retrieved From URL: https://en.wikipedia.org/w/index.php?title=Machine_learningoldid=1031317668.

Yin Z., et al., "On the Dimensionality of Word Embedding," In Advances in 32nd Conference on Neural Information Processing Systems (NeurIPS 2018), Montreal, Canada, pp. 887-898, 12 Pages.

U.S. Appl. No. 17/514,434.

\* cited by examiner

FIG. 2

```
401  description: Full Range_Discovery_Club Pricing
402  params:
       prod_count_min: 3
       prod_count_max: 6
403  sorters:
       - sort_by: Random
         sort_ascending: false
404  filters:
       - feature: discovery_pctile
         comparator: geq
         value: 0.9
       - feature: national_price
         comparator: geq
         value: 20
```

```
┌─────────────────┐
│ Develop family of│  501
│    messages     │
└─────────────────┘
         │
┌─────────────────┐
│ Identify variants│  502
│  within family  │
└─────────────────┘
         │
┌─────────────────┐
│ Develop recipe  │  503
│ for each variant│
└─────────────────┘
         │
┌─────────────────┐
│ Develop one or  │
│ more actions for│  504
│   each recipe   │
└─────────────────┘
         │
┌─────────────────┐
│ Determine recipe│
│ and products for│  505
│  each customer  │
└─────────────────┘
         │
┌─────────────────┐
│   Determine     │
│ optimal action  │
│ for chosen recipe│ 506
│  and customer   │
└─────────────────┘
         │
┌─────────────────┐
│ Deploy messages │  507
│  to customers   │
└─────────────────┘
```

FIG. 5

|        | Item 1 | Item 2 | Item 3 | Item 4 | Item 5 |
|--------|--------|--------|--------|--------|--------|
| Item 1 | 1      | 0.98   | 0.7    | 0.2    | 0.1    |
| Item 2 | 0.98   | 1      | 0.25   | 0.5    | 0.6    |
| Item 3 | 0.7    | 0.25   | 1      | 0.6    | 0.8    |
| Item 4 | 0.2    | 0.5    | 0.6    | 1      | 0.1    |
| Item 5 | 0.1    | 0.6    | 0.8    | 0.1    | 1      |

Prior Art flow: Brands

| Dr. Oetker Casa di Mama | Dr. Oetker Ristorante | Dr. Oetker Ristorante | Dr. Oetker Giuseppe Thin | Dr. Oetker Giuseppe Rise | Private Label | Delissio Thin | Delissio Pizzeria + Crispy Pan | Delissio Rising + Crispy Pan | Delissio Stuffed |

2200
2201

Need state flow: Crust + price point

| Private Label + Dr. Oetker | Dr. Oetker Ristorante | Dr. Oetker Giuseppe Thin | Dr. Oetker Casa di Mama | Delissio Thin Crust + | Delissio Pizzeria | Dr. Oetker Giuseppe Rise | Delissio Rising + Crispy Pan | Delissio Stuffed + Crispy Pan |

2202

☐ Major change   ☐ Minor change   ☐ No change

FIG. 22

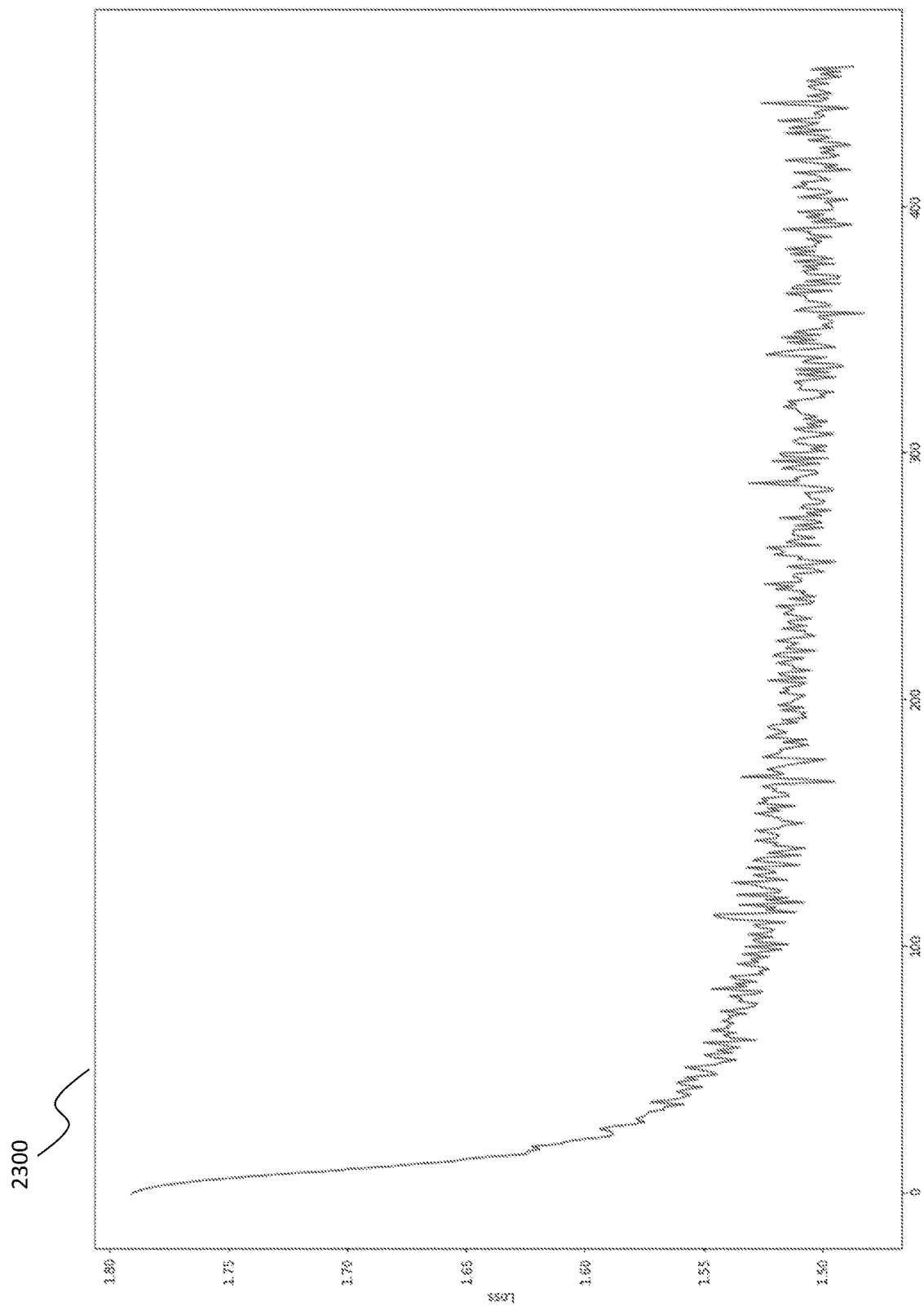

SYSTEMS AND METHODS FOR IDENTIFYING ITEM SUBSTITUTIONS

CROSS-REFERENCE TO RELATED APPLICATIONS

This application is a continuation-in-part of U.S. patent application Ser. No. 17/806,385 filed Jun. 10, 2022, entitled "SYSTEMS AND METHODS FOR IDENTIFYING ITEM SUBSTITUTIONS," which claims priority to U.S. Provisional Application No. 63/362,351, filed Apr. 1, 2022, entitled "SYSTEMS FOR GENERATING INDIVIDUALIZED MESSAGING USING STOCK-KEEPING UNITS," and U.S. Provisional Application No. 63/362,274, filed Mar. 31, 2022, entitled "METHODS FOR ANALYZING AND PREDICTING CUSTOMER BEHAVIOR," and is a continuation-in-part of U.S. patent application Ser. No. 17/514,434 filed Oct. 29, 2021, entitled "SYSTEMS AND METHODS FOR USING SKU VECTOR INFORMATION," which is a continuation of U.S. patent application Ser. No. 17/015,863 filed Sep. 9, 2020 (now U.S. Pat. No. 11,321,763), which claims priority to U.S. Provisional Application No. 63/003,527 filed Apr. 1, 2020. This application additionally claims priority to U.S. Provisional Application No. 63/362,351, filed Apr. 1, 2022, entitled "SYSTEMS FOR GENERATING INDIVIDUALIZED MESSAGING USING STOCK-KEEPING UNITS," and U.S. Provisional Application No. 63/362,274, filed Mar. 31, 2022, entitled "METHODS FOR ANALYZING AND PREDICTING CUSTOMER BEHAVIOR." The entirety of each application listed above is herein incorporated by reference."

BRIEF DESCRIPTION OF THE DRAWINGS

Aspects and embodiments of this application are depicted in the figures, wherein:

FIG. 2 illustrates an interface for interacting with an action catalog in accordance with an embodiment.

FIG. 4 illustrates message recipe stored in a human-readable data-serialization language in accordance with an embodiment.

FIG. 5 illustrate an example workflow for generating customized messaging in accordance with an embodiment.

FIG. 18B illustrates an example item similarity matrix in accordance with an embodiment.

FIG. 22 illustrates a product adjacency example comparing the prior art method and a need states-based method. in accordance with an embodiment.

FIG. 23 depicts a graph of model loss over time, for an example dataset, in accordance with an embodiment.

DETAILED DESCRIPTION OF EMBODIMENTS

Figure 1:
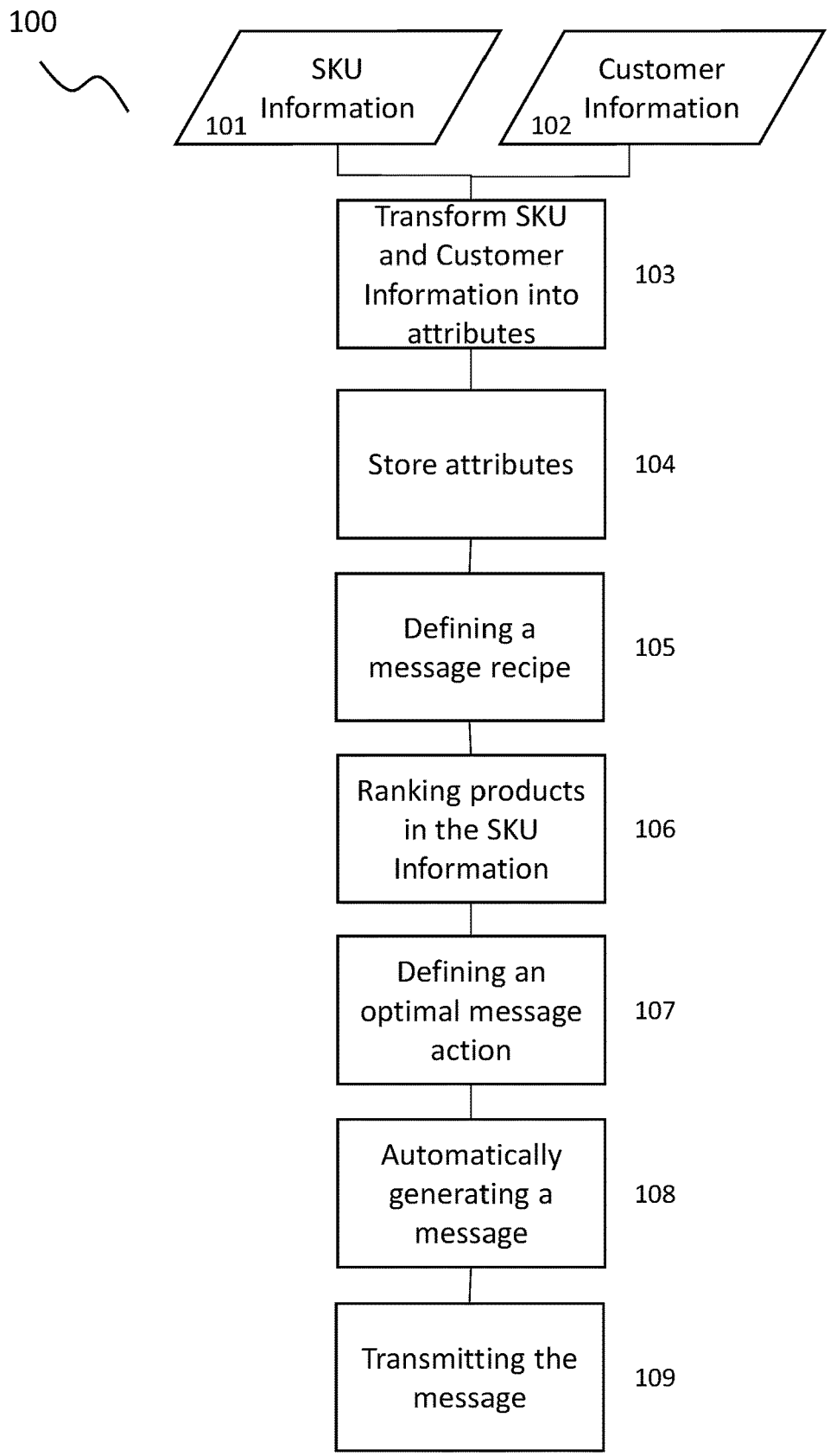
FIG. 1 depicts a flow diagram for a computerized method of generating customized messaging in accordance with an embodiment.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the term "need state" refers to a group of items that represent a unique customer need. For example, a shopper may generally only purchase a single salty snack in a single shopping trip but may vary between potato chips, corn chips, and pretzels on varying trips. A "need state" may be based on a single customer or any plurality of customers (e.g., all shoppers at a given storefront or shoppers between the ages of 35 and 45). A "need state" may include one or more potential similar, or substitution, items. A customer may have a preferred choice item of the one or more substitution items.

As used herein, the term "shopping mission" means a singular trip to one or more stores or a single online checkout. A "shopping mission" may comprise one or more need states of an associated customer. For example, a first customer may plan a shopping mission to purchase milk and eggs, while a second customer plans a shopping mission to restock their entire pantry. Though many embodiments may reference a physical storefront, one of ordinary skill in the art will recognize that the systems and methods described herein may be similarly applicable to an online store.

As used herein, the term "basket" refers to shopping basket comprising the items purchased on a specific shopping mission.

As used herein, the singular forms "a," "an," "the," and "said," etc. include plural references unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

Individualized Messaging Using Stock Keeping Units

Referring to FIG. 1, a flow diagram for a computerized method of generating customized messaging 100 is depicted in accordance with an embodiment. In certain embodiments, the method may comprise receiving stock-keeping unit (SKU) information 101. In some embodiments, the SKU information 101 comprises a database of products. The product database may include information relating to one or more products. In further embodiments, the product database may comprise some combination of the SKU, price, category of the product, margin of the product, stock of the product, manufacturer of the product, or characteristics for each product. In some embodiments, a portion of the information may be encoded into the SKU. In some embodiments, a portion of the information may be tied to a geographic location (i.e. a region or specific warehouse/store). In further embodiments, the product database includes imagery of the product.

In certain embodiments, the method may comprise receiving customer information 102. In some embodiments, the customer information 102 comprises a customer database. In further embodiments, the customer database may comprise some combination of a customer's name, a nickname, an email, a phone number, a purchase history, a message history, a username, and demographic information for each customer. In some embodiments, the purchase history may comprise one or more purchased product names or SKUs, associated dates of purchase, and locations of purchase. In some embodiments, the message history may comprise some combination of a database of all, or recent, messages sent to the customer and any interaction of the customer with the message. In further embodiments, an interaction with a message may comprise opening the message, clicking the message, or making a purchase based on the message. In some embodiments, the demographic information may comprise some combination of a location, age, or gender of the customer.

In certain embodiments, the method may comprise transforming received information 101/102 into standardized attributes 103. In some embodiments, the attributes may be characteristics of the product, a relationship between a customer and the product, or a relationship between a set of customers and the product. A person of ordinary skill in the art will note that an attribute may need updating periodically. In some embodiments, some attributes may be updated periodically. In some embodiments, some attributes may be updated in real-time as changes are made to the SKU information 101 and client information 102. In some embodiments, some attributes may be recalculated during the process of generating a message associated with one or more products. In some embodiments, some attributes may be recalculated during the process of generating a message for a specific customer.

In certain embodiments, a portion of the attributes may be associated with the SKU. In some embodiments, attributes associated with the SKU comprise at least one of: product category, price, discount status, the margin of the product, stock of the product, seasonality, label or manufacturer, release date, bundles purchases associated with product, or characteristic of the product (e.g., color, size). In some embodiments, a portion of the attributes associated with an SKU may be manually entered. In some embodiments, a portion of the attributes associated with an SKU may be mined from existing documentation associated with the SKUs. In some embodiments, a portion of the attributes associated with an SKU may be derived through computer vision techniques applied to an image of the product. In some embodiments, a single SKU may be associated with multiple instances of the same attribute (e.g., a shirt may be in a "t-shirt," "shirt," and "clothing" category).

In certain embodiments, a portion of the attributes may be associated with the SKU and the targeted customer or a portion of the entire customer database. In some embodiments, attributes associated with the SKU and the targeted customer, or a portion of the entire customer database comprise at least one of: a discovery score (i.e., a score for how likely a customer is to purchase a product given prior purchases and other customer purchases), a popularity score (i.e., a score based on popularity of an item based on purchases or revenue generated), a repurchase score (i.e., a score based the likelihood a customer will repurchase a product), a complementary product score (i.e., a score based on the likelihood two products are purchased together), and an alternative score (i.e., a score based on similarity to another product which may also include data relating to the differences in the products). In some embodiments, a discovery score may be obtained via a collaborative filter. In some embodiments, the repurchase score is generated using a machine learning algorithm trained on other customers who purchased the product. In some embodiments, any of the above referenced scores may be limited to a specific timeframe (e.g., a date range, a season, a month, a day of the week, a time of day, or some combination). In some embodiments, any of the above referenced scores may be limited to a subset of markets (e.g., online only, in person only, the customer's favorite store, stores within a certain area).

In certain embodiments, an attribute may comprise a random element. A random element may allow for variation in messaging. In some embodiments, a random attribute may be pseudorandom, meaning the random element is based on other information. For example, a pseudorandom element may comprise a hash of some combination of a piece of user information and the date. In some embodiments, the random element may be configured to stay consistent for a predetermined time.

In certain embodiments, at least a portion of the attributes, as described herein, may be stored on a non-transitory storage medium 104. In further embodiments, the non-transitory storage medium may be interfaced to one or more processors and/or one or more network interfaces. In some embodiment, the one or more processors may be configured to perform at least a portion of the process as presented in FIG. 1. In some embodiments, the one or more processors may be configured to provide authentication for secure network access to the attribute information stored on the on the non-transitory storage medium.

In certain embodiments, the method may comprise defining a message recipe 105. A message recipe defines, in a structured manner, the dynamic content relating to SKUs which may appear in a message based on associated attributes. In some embodiments, the message recipe may require an SKU and/or customer to have one or more specific attributes defined. In some embodiments, the message recipe may define an attribute filter requiring a specific status of an attribute. The defined status may comprise a single value or range of values allowable under the filter. As an example, an attribute filter may require a product category "t-shirt" and a discounted status above 15%. In further embodiments, an attribute filter may comprise Boolean logic operators. As an example, an attribute filter may require a product category "t-shirt" OR product category "sweatshirt." In some embodiments, the message recipe may define one or more attributes on which to rank SKUs 106. As an example, the SKUs may be ranked based on the popularity score. In further embodiments, multiple attribute rankings may be applied in a single message recipe. When combining multiple rankings, each ranking may be individually weighted to create a total ranking. In some embodiments, if the message recipe comprises no ranking, then the filters SKUs may be arbitrarily or randomly ranked. In further embodiments, a random ranking may be based on the random attribute. In further embodiments, filters and rankings may comprise threshold values. For example, a filter could be configured on the popularity attribute for only products with the highest 100 scores. In another example, a ranking could be configured on the popularity score based on the last 100 days of purchases in store branch #12.

In certain embodiments, the message recipe may comprise a quota of SKUs to be associated with the message recipe. A quota may comprise a minimum and/or maximum number of SKUs. In some embodiments, if the message recipe ranks a quantity of SKUs greater than the maximum quantity, then only the maximum quantity of highest ranked SKUs may be stored for inclusion in the message. In some embodiments, if the message recipe ranks a quantity of SKUs less than the minimum quantity, then the message recipe may fail to produce a result for the targeted customer.

In certain embodiments, the method comprises defining an optimal message action 107. A message action defines the message itself. In some embodiments, the message action may comprise the copy text of the message with dynamic fields for SKUs computed by message recipe and customer information. In some embodiments, the message action may comprise one or more media elements, such as an audio, video, or image component. In further embodiments, at least a portion of the one or more media elements may also be dynamic. For example, an audio message may comprise dynamic pre-recorded or computer-generated audio corresponding to the relevant SKUs. In another example, a visual message may include images of the SKUs. In some embodiments, message actions may comprise links to a uniform resource locator (URL). In further embodiments, the URL may be dynamically associated with the SKUs. In some embodiments, one or more message actions may be associated with each message recipe.

In certain embodiments, defining an optimal message action 107 may comprise scoring the action with respect to the customer.

In some embodiments, a machine learning algorithm may be trained on a data set comprising a database of message actions, customer information, wherein the customer information comprises historical information associated with message interaction. As an example, message interaction may comprise clicking on a link within the message or making a purchase based on the message. In some embodiments, tracking a purchase based on a message may comprise at least one of purchasing online in a session generated by clicking a URL in the message or purchasing from an account (i.e., an online account, a loyalty card, or a debit/credit card) linked with the customer within a predetermined timeframe of receiving the message. In some embodiments, the machine learning algorithm may be trained to identify a success score for a message action for a given customer based on the activity of similar customers.

In alternative embodiments, message action scores may be derived entirely on previous success. Success scores may be based on the entire population of customers, or a subset based on an attribute associated with the targeted customer. As an example, a success score for a message action may be generated for all customers in the 30 to 40-year-old demographic.

In some embodiments, a machine learning algorithm may be trained to generate an appropriate message action based on a customer and a message recipe. In further embodiments, the machine learning algorithm may be further trained on success scores of previous messages to achieve a maximum success of the message action.

Through the combination of a message recipe and message action, a message may be automatically generated 108. In some embodiments, the completed message may be stored on a non-transitory storage medium.

In certain embodiments, automated quality assurance may be performed during at least one of defining the message recipe 105, defining the message action 107, or generating of the message 108. In some embodiments, automated quality assurance may comprise validating if a similar message has been sent to the customer within a predetermined time. In some embodiments, some combination of complete messages, message recipes, ranked SKUs, and message actions may be stored for comparison to an in-development message. In some embodiments, development on a new message that is similar to a prior message sent to the customer may be halted by the system. In further embodiments, on detection of a similar message, the system may introduce an additional random attribute to produce a different message.

In certain embodiments, the completed message may be transmitted to the customer 109. Transmission of a message may comprise at least one of: an email, an SMS message, an application push, a webpage push, a webpage serve request, an inbound phone call, or an outbound phone call.

Referring to FIG. 2, an interface 200 for interacting with a message action catalog is depicted in accordance with an embodiment. In some embodiments, the interface 200 comprises a tabular view of the message action catalog database. One of ordinary skill in the art will recognize that alternative interface layouts may also be beneficial. For example, each message action may be represented by an icon on the interface. In alternative embodiments, message actions may be categorized with each category depicted in a table, list, folder, or icon. In some embodiments, message actions may be categorized based on an action family, action status, action related dates, subject key words, urgency, tone, channel, region, or usage occasion. In some embodiments, action families may be generated based on linked message recipes and/or the linked message recipes' contributing attributes.

In certain embodiments, the message action catalog interface may allow users to view and/or configure the message action. Information depicted in the interface may comprise at least one of: a unique action identifier 201, an action family identifier 202, the associated message recipe identifier 203, an action status 204 (e.g., active, inactive, archived), an engine status 205 (e.g., should using this action be automated), action start 206 and end 207 dates for actions valid for a limited time, the subject line 208 or hook for the action, the copy text of the action, an implied urgency of the message 209 (e.g., none, implied temporary price, stated temporary price, timed availability), tone of voice 210 (e.g., conversational, direct), regionality (e.g., regional languages or dialects), channel 211 (e.g., instore, online, direct to customer), usage occasion 212 (e.g., a holiday or season). In some embodiments, portions of the data may be configured by a user by clicking on the data or an interface element associated with the data. In further embodiments, configuring at least a portion of the data may require the user to be of a sufficient authentication level.

In some embodiments, new message actions may be manually added to the database. Additionally, or alternatively a machine learning algorithm may be trained to analyze the success of prior messages, based on a customer response through interactions with the message or purchases, or the associated message recipe's similarity to other message recipes and formulate new message actions based on any of the above information associated with the message action or an associated message recipe. As an example, a new message recipe may be generated in the system which requires at least one new message action. The new message action may be generated based on one or more message actions associated with similar message recipes, where a similar message recipe features similar attributes, filters, or rankings.

Figure 3A:
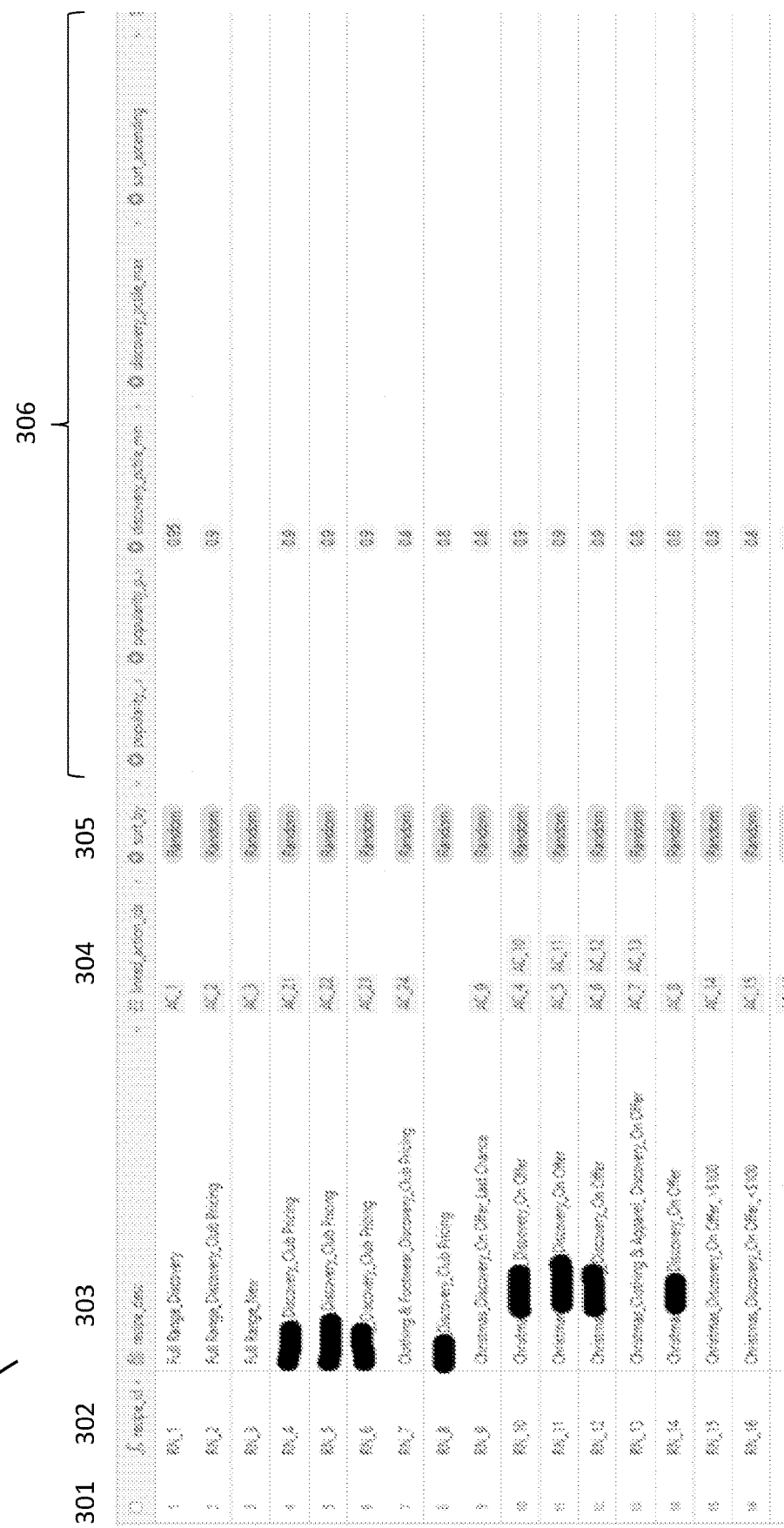
FIGS. 3A-3B illustrate an interface for interacting with a recipe catalog in accordance with an embodiment.
Figure 3B:
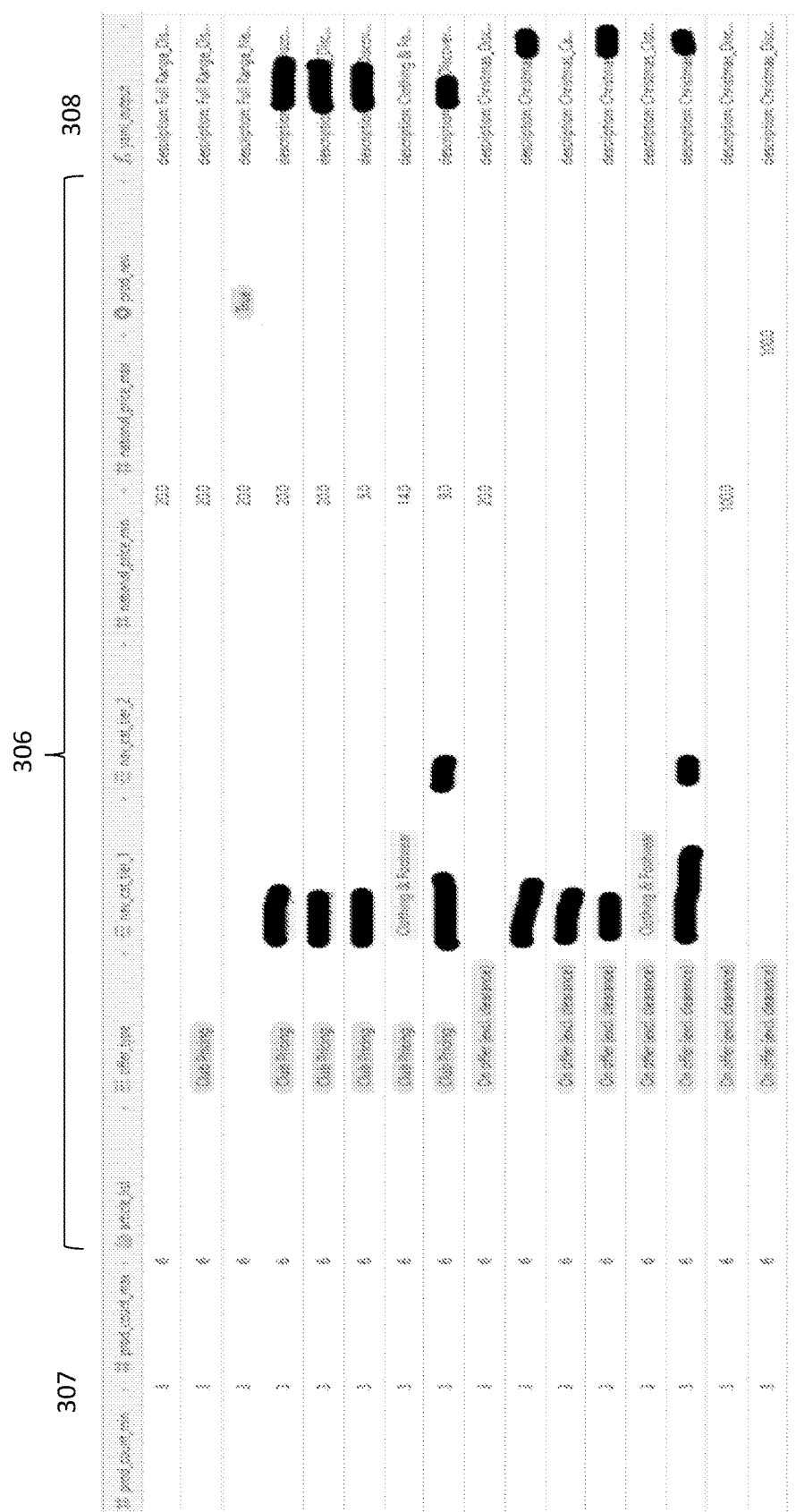

Referring to FIGS. 3A and 3B, an interface 300 for interacting with a message recipe catalog is depicted in accordance with an embodiment. In some embodiments, the interface 300 comprises a tabular view of the message recipe catalog database. One of ordinary skill in the art will recognize that alternative interface layouts may also be beneficial. For example, each message recipe may be represented by an icon on the interface. In alternative embodiments, message actions may be categorized with each category depicted in tables, lists, folders, or icons.

In certain embodiments, the message recipe catalog interface may allow users to view and/or configure the message recipe. Information depicted in the interface may comprise at least one of: a unique recipe identifier 301, a recipe identifier 302, a recipe description 303, the identifiers of linked actions 304, one or more sorting or ranking attributes 305, one or more filter attributes and the associated numerical thresholds 306, product quotas 307, and a human-readable data-serialization language (e.g., Extensible Markup Language (XML) or YAML) representation of the recipe 308. In some embodiments, portions of the data may be configured by a user by clicking on the data or an interface element associated with the data. In further embodiments, configuring at least a portion of the data may require the user to be of a sufficient authentication level.

In some embodiments, new message recipes may be manually added to the database. Additionally, or alternatively a machine learning algorithm may be trained to analyze the success of prior messages, based on customer response through interactions with the message or purchases, and formulate new message recipes based on filter and ranking on certain attributes. In some embodiments, the machine learning algorithm may develop a full message recipe based on a subset of filters and/or rankings. As an example, a user may request a message recipe filtered to the product category "t-shirts" and the machine learning algorithm may suggest ranking based on a discovery score and providing a quota of five SKUs to the customer.

Referring to FIG. 4, a definition of a message recipe is depicted in a human-readable data-serialization language 400 in accordance with an embodiment. In this example YAML is used as the human-readable data-serialization language, but one of ordinary skill in the art will understand that multiple other languages could operate similarly (e.g., XML). The definition 400 comprises the recipe description 401, parameters 402 (e.g., the product quotas), applicable attributes to rank 403, and applicable attributes to use as filters along with the associated thresholds 404.

In some embodiments, message actions and recipes may be added to the system via configuration files. In further embodiments, a configuration file comprises usage of a human-readable data-serialization language (e.g., XML or YAML). In some embodiments, a configuration file may have similar features to the description presented in FIG. 4.

Example Workflow

Referring to FIG. 5, an example workflow for using the described systems and methods is depicted. A marketing manager may determine a general marketing strategy which may comprise developing a concept for a family of message 501. Either the system, as described herein, or a marketing team may identify variants within the family 502. Based on the identified variants, the system or a marketing team may develop a message recipe for each variant 503. Based on the message recipes, the system or a marketing team may develop one or more message actions for each message recipe 504. With a developed database of message recipes and actions, the system may determine a recipe and products for each customer 505. Based on the determined recipe and products, an appropriate associated action may be determined 506. The message may then automatically be generated and transmitted by the system 507.

Example Embodiments

In some embodiments, a computer-implemented system for creating and transmitting dynamic messages can include a processor in communication with a network and a non-transitory storage medium, the processor configured for accepting stock keeping unit information associated with one or more products, and customer information associated with a customer and historical customers; transforming the stock keeping unit information and customer information into standardized attribute information, wherein the standardized attribute information comprises attributes associated with each of the one or more products; storing, on the non-transitory storage medium, the standardized attribute information; defining a message recipe based on the presence of a subset of the one or more attributes; ranking the one or more products based on subset of the one or more attributes; defining a message action based on message and a message template; automatically generating a message comprising the message action and at least one of the one or more products based on the ranking; and transmitting the message to the customer over the network.

In some embodiments, the processor is configured for filtering the one or more products based on the attributes.

In some embodiments, the attributes include a category

In some embodiments, the attributes include a price.

In some embodiments, the price attribute includes a discount.

In some embodiments, the attributes include a discovery score configured to score an affinity level for the customer for each of the one or more products.

In some embodiments, the processor is configured for determining the discovery score using collaborative filtering.

In some embodiments, the attributes include a popularity score of the one or more products.

In some embodiments, the popularity score is specific to one or more stores the customer has a shopping history.

In some embodiments, the attributes include a repurchase score.

In some embodiments, the attributes include a complementary product score configured to weight products frequently purchased together.

In some embodiments, the attributes include a random element.

In some embodiments, ranking the one or more products based on the attributes further includes selecting a product quota based on the ranking of at least one attribute.

In some embodiments, transmitting the message to the customers includes at least one of transmitting an email, SMS message, application push, webpage push, webpage serve request, inbound phone call, or outbound phone call.

In some embodiments, the processor is configured for filtering the one or more products based on historical information associated with the customer; and storing, on the non-transitory storage medium, the message action and the at least one of the one or more products based on the ranking as the historical information associated with the customer.

In some embodiments, ranking the one or more products based on the attributes includes training a machine learning algorithm using the stock keeping unit information, the customer information, and the message action; ranking the one or more products using the machine learning algorithm; receiving feedback on customer action generated by the transmitted message; and validating the machine learning algorithm based on the feedback.

In some embodiments, the message recipe includes one or more quotas.

Analyzing and Predicting Customer Behavior

Figure 6:
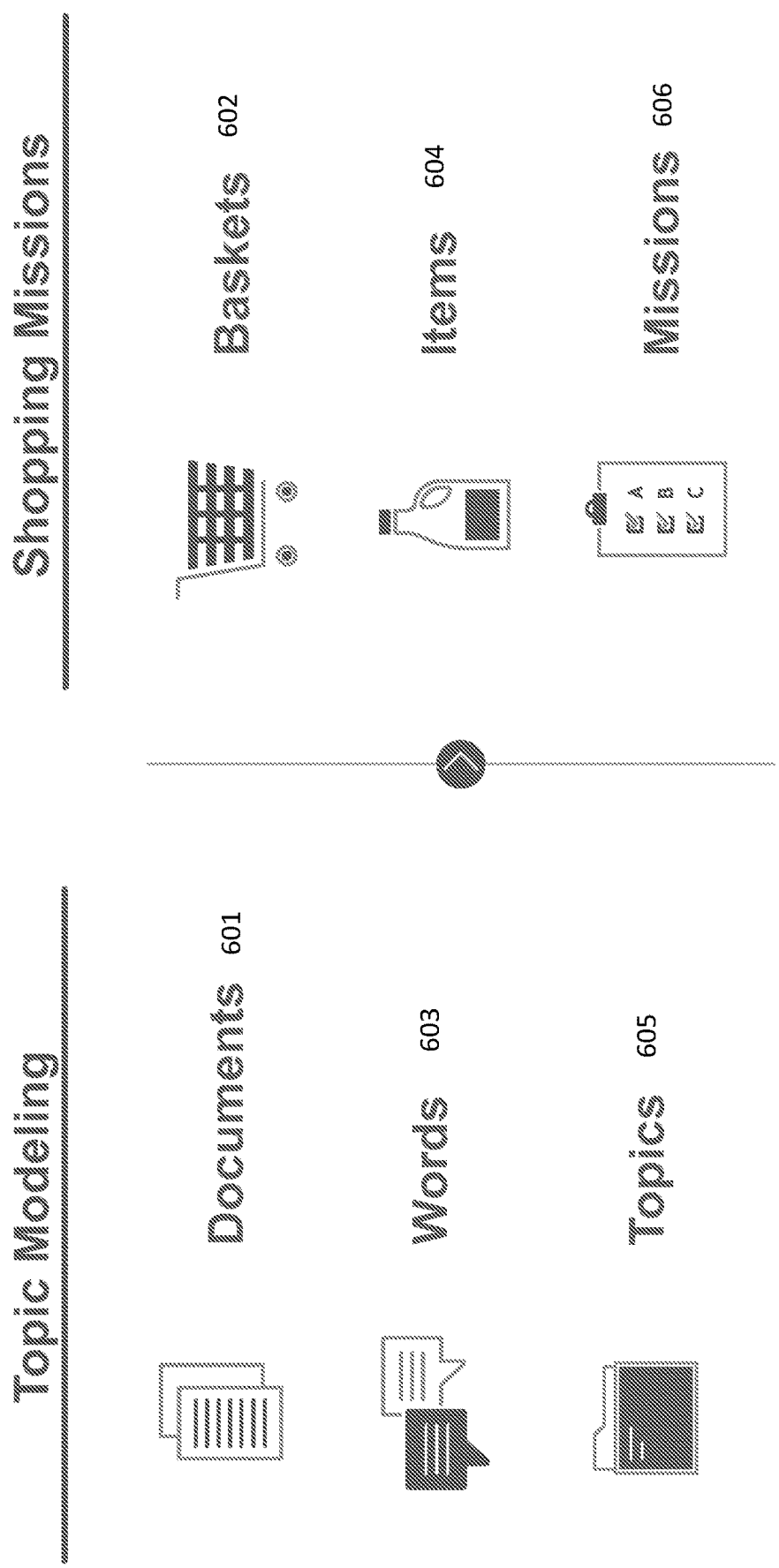
FIG. 6 depicts a natural language processing approach to modeling shopping missions in accordance with an embodiment.

Referring to FIG. 6, a natural language processing approach to modeling shopping missions is depicted in accordance with an embodiment. Natural language processing, as a subfield of machine learning, is devoted to the analysis of text or speech. Some natural language processors, such as doc2vec, generate statistically significant mathematical representations of a topic 605 of a document 601 through an analysis of the words 603 within the document 601. As disclosed herein, in certain embodiments, a natural language processing model may be trained to generate a representation of the topic 605 or shopping mission 606 of a basket 602, associated with a shopping episode, based on the items 604 found in the basket 602. A training set may comprise a database of historical shopping baskets associated with one or more customers.

In natural language processing, Latent Dirichlet Allocation (LDA) may be used to discover topics 605 in a collection of documents 601. In certain embodiments, by training an LDA model on a training set of baskets 602 and their corresponding items 604, a segmentation of shopping missions 606 may be generated. It should be noted that a dataset comprising items 604 may also comprise additional associated information which may provide contextual relevance to the item names (e.g., stock-keeping units, product categories, product descriptions, etc.). One of ordinary skill in art will recognize that other models (e.g., probabilistic latent semantic analysis, K-means clustering) may also be used to generate useful shopping mission categories.

In certain embodiments, manual selection of shopping missions 606 categories may be performed. Manual selection may comprise a complete segmentation of the basket 602 and item 604 space or simply manipulating one of the above models. For example, a user may predefine the number of missions 606 in a space or merge/subdivide identified missions 606. In some embodiments a manual selection, such as described herein, may better align the final suggested missions with a business strategy.

In some embodiments, different shopping missions may be identified for different stores or regions. One of ordinary skill in the art will note that even though the example shopping missions discussed herein are applicable to the grocery industry, similar missions may apply to other retail industries.

In certain embodiments, the natural language processing model may measure the important of items 604 within a basket 602. In some embodiments, the term frequency-inverse document frequency (TFIDF) may be calculated for a basket 602. The term frequency describes the count of the items 604 within the basket 602. The inverse document frequency describes the frequency the item 604 appears across all baskets. The TFIDF allows items common to all customers to be weighted as less important in comparison to rarer items. As an example, if almost all grocery store customers purchase milk but only 10% purchase avocados, the TFIDF allows the model to properly recognize that avocados may be a better discriminator of a customer's shopping mission and adjust the model accordingly.

Figure 7:
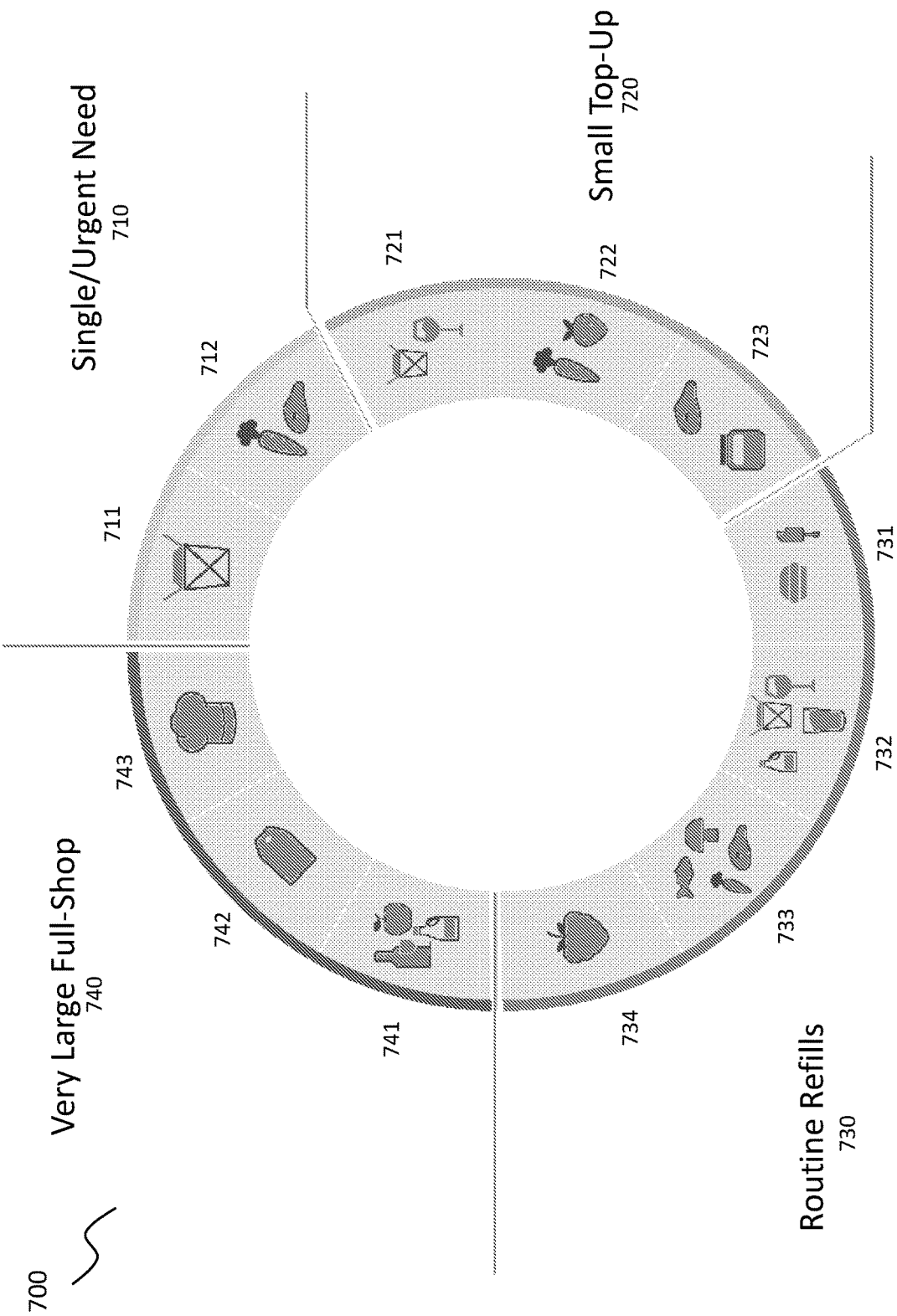
FIG. 7 illustrates a spectrum of shopping mission categories in accordance with an embodiment.

Referring to FIG. 7, a segmentation of identified shopping mission categories 700 is depicted in accordance with an embodiment. In an example region, twelve shopping missions were identified. The twelve shopping missions were divided into four regions corresponding to the approximate price of the basket. Small/Urgent Need missions 710 featured baskets with a cost under twenty dollars. Small/Urgent Need missions were subdivided into Food for Now missions 711 and Missing Ingredient missions 712. Food for Now missions 711 were characterized by very small baskets with food for immediate consumption such as hot entrees, sandwiches, prepared produce, snacks, and beverages. Missing Ingredient missions 712 were characterized by very small baskets focused on fresh produce, meat, seafood, and dairy.

Small Top-Up missions 720 featured baskets with a cost approximately between twenty and fifty dollars. Small Top-Up missions 720 were subdivided into Food for Now Plus missions 721, Fresh Food Now missions 722, and Quick Cook Meal missions 723. Food for Now Plus 721 missions were characterized by similar baskets as the Food for Now missions 711 with the addition of alcohol, bakery desserts, and deli items. Fresh Food Now missions 722 were characterized by baskets containing fresh fruits, vegetables, dips, deli items, and seafood with a higher likelihood of containing organic options. Quick Cook Meal missions 723 were characterized by baskets containing items to prepare quick meal at home and were more likely to contain protein (e.g., beef, pork, sausages) and related ingredients (e.g., pasta, pasta sauce, taco kits, meal makers, and canned vegetables).

Routine Refill missions 730 featured baskets with a cost between fifty and eighty dollars. Routine Refill missions were subdivided into Heat, Eat, and Snack missions 731, Night in, No Cooking missions 732, Scratch Cooking Top-Up missions 733, and Organic Staples missions 734. Heat, Eat, and Snack missions 731 were characterized by baskets containing prepared frozen food, canned foods, ambient sides, commercial bakery food, carbonated soft drinks, and snacks. Night in, No Cooking missions 732 were characterized by baskets containing kitchen items, alcohol, prepared fruits and vegetables, deli items, and a possibility of distress purchases such as toilet paper, laundry detergent, cleaning products, and pet food. Scratch Cooking Top-Up missions 733 were characterized by baskets containing fresh foods such as produce, meat, and seafood. Organic Staples missions 734 were characterized by baskets containing cereal, yogurt, cereal bars, snacks, breakfast spreads, and fruit.

Very Large Full-Shop missions 740 featured baskets with a cost over eighty dollars. Very Large Full-Shop missions 740 were subdivided into Traditional Full-Shop missions 741, Price Sensitive Full-Shop missions 742, and Upmarket Full-Shop missions 743. Traditional Full-Shop missions 741 were characterized by baskets including toilet paper, paper towels, laundry detergent, cleaning supplies, and wine. Traditional Full-Shop mission 741 baskets also typically included conventional, mainstream brands. Price Sensitive Full-Shop mission 742 were characterized by baskets including frozen food, processed and ready to eat ambient foods, carbonated soft drinks, and snacks. Price Sensitive Full-Shop mission 742 also typically included products targeted to children. Upmarket Full-Shop missions 743 were characterized by baskets including high price per unit items such as organic foods and gourmet ingredients.

Figure 8:
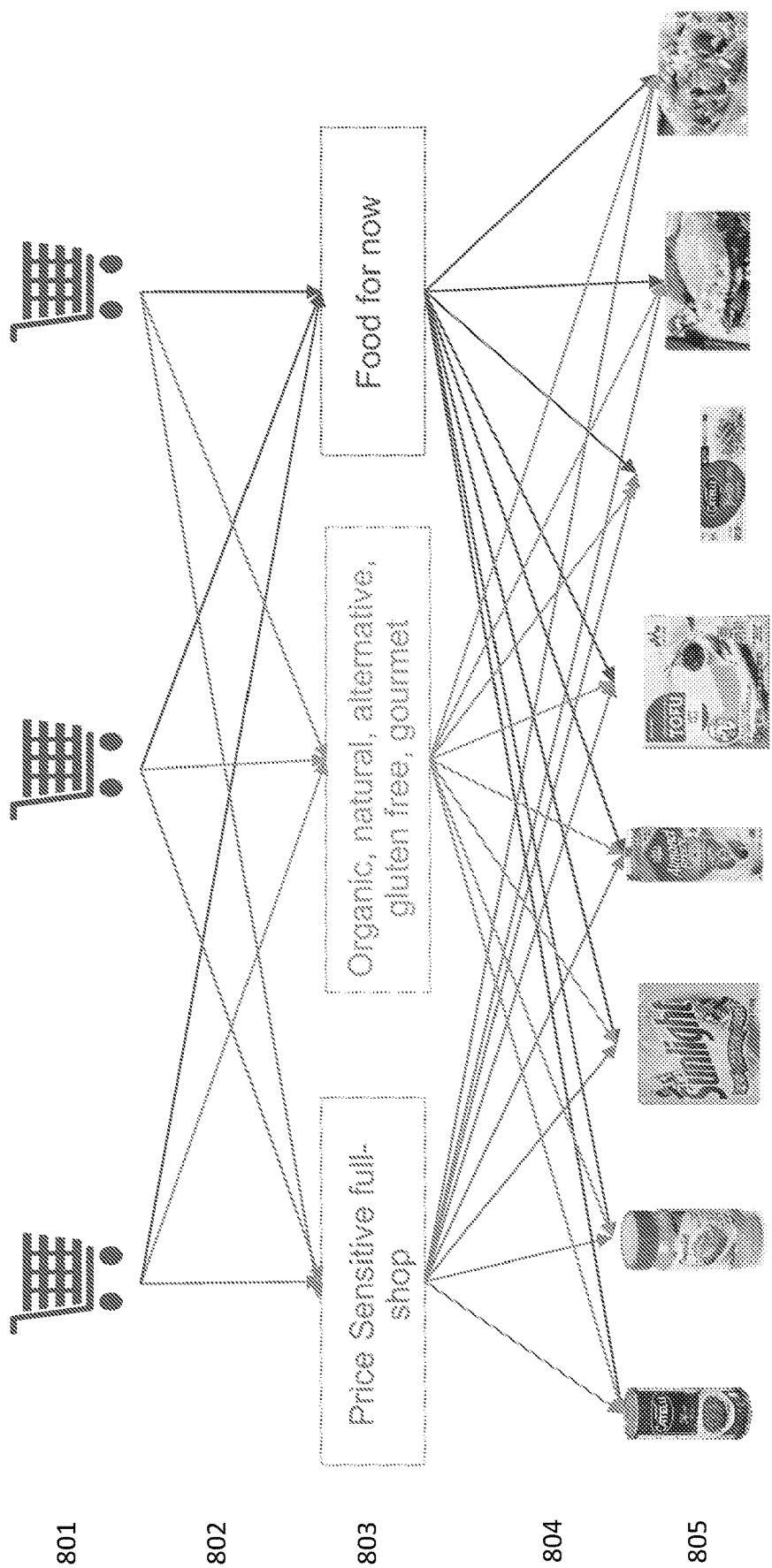
FIG. 8 illustrates a relationship between shopping baskets, missions, and items in accordance with an embodiment.
Figure 9:
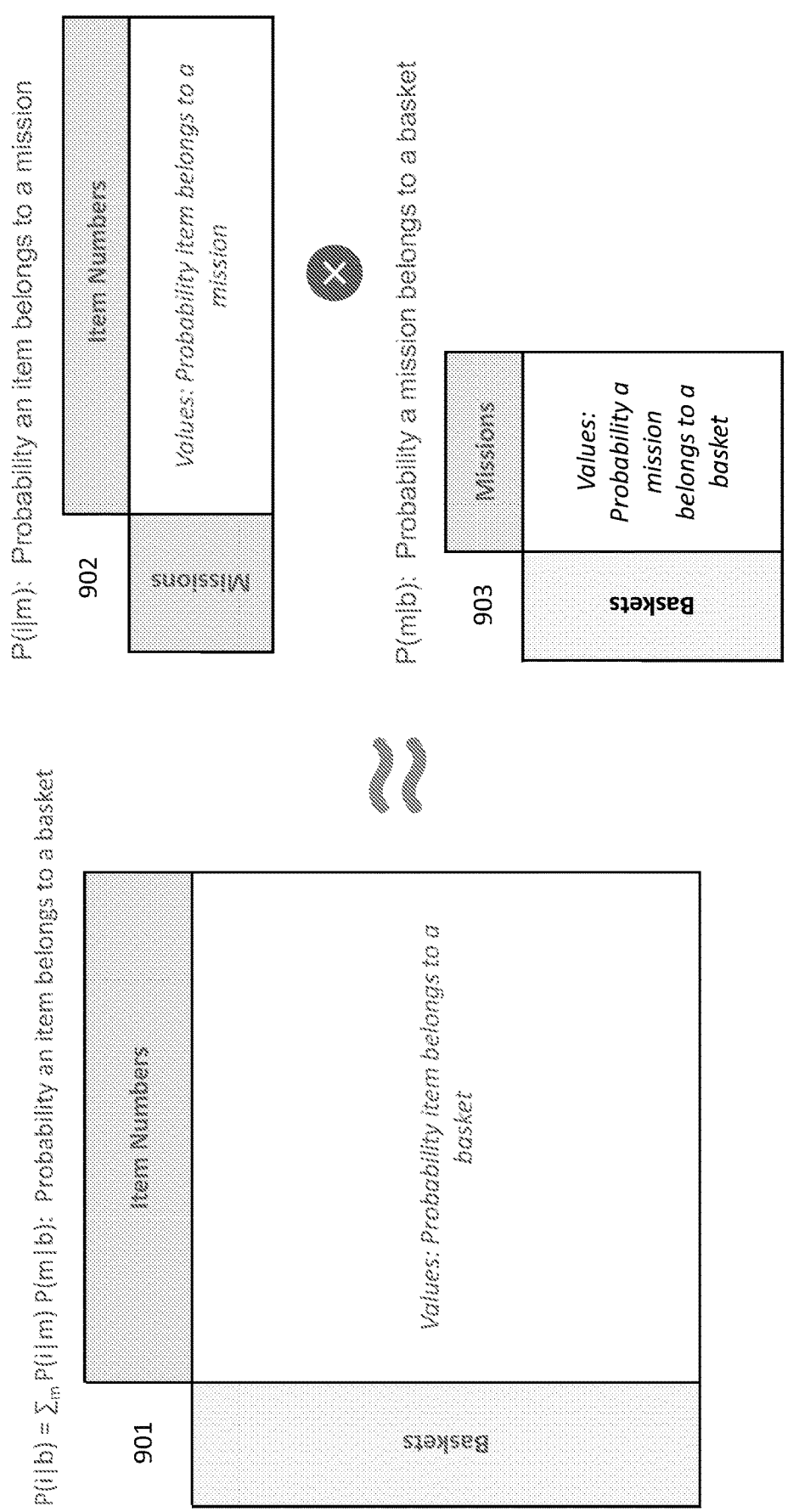
FIG. 9 illustrates a mathematical relationship between shopping baskets, missions, and items in accordance with an embodiment.

Referring to FIG. 8, a relationship between shopping baskets 801, missions 803, and items 805 is illustrated in accordance with an embodiment. In the example, three categories of missions 803 are presented. Given the probability of a customer going on a specific mission given a basket 802 and the probability of the customer selecting a certain item given a mission 804:

$$P(m|b) \text{ and } P(i|m)$$

then, briefly referring to FIG. 9, the probability of a customer selecting a certain item given a current basket 901 can be calculated as the sum of all products of the probability that an item belongs to a mission 902 and the probability that mission belongs to a basket 903:

$$P(i|b) = \Sigma_m P(i|m) P(m|b)$$

Figure 10:
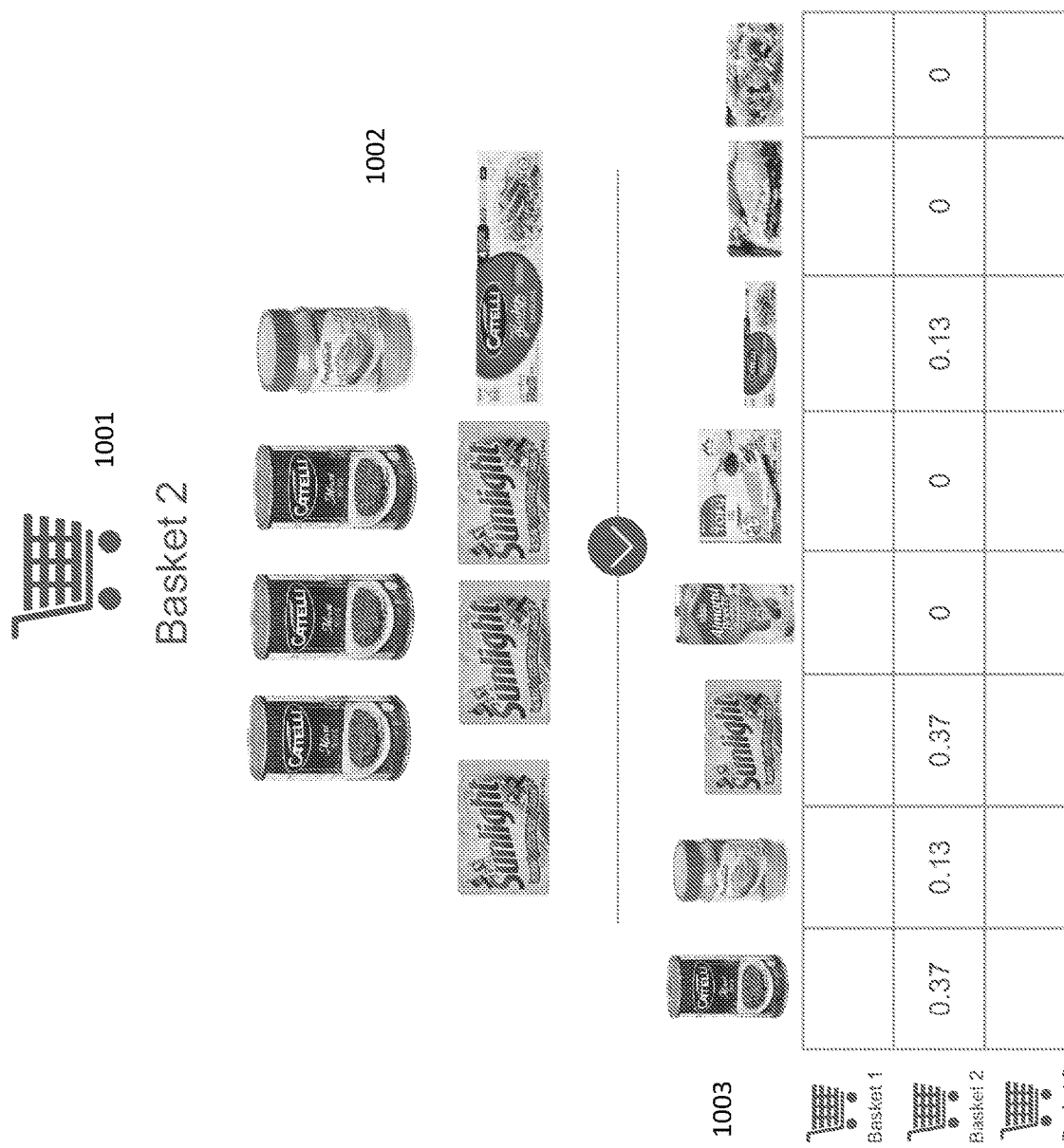
FIG. 10 illustrates the calculation of the probability that a given item belongs to a basket in accordance with an embodiment.

Referring to FIG. 10, calculating the probability that a given item belongs to a basket based on transactional data is depicted in accordance with an embodiment. In some embodiments, one or more stores, either physical or online locations, may collect transactional data comprising the basket 1001 and the associated items 1002 for at least a portion of all transactions. In further embodiments, the transactional data may comprise identifying information associated with the customer (e.g., name, customer ID, rewards membership ID, online account, phone number) which may be used identify customers associated with each transaction. In some embodiments, the items 1002 may be tracked via a stock-keeping unit associated with each item.

The transactional data may be used to establish an actual likelihood of each item appearing that specific basket 1003.

Figure 11:
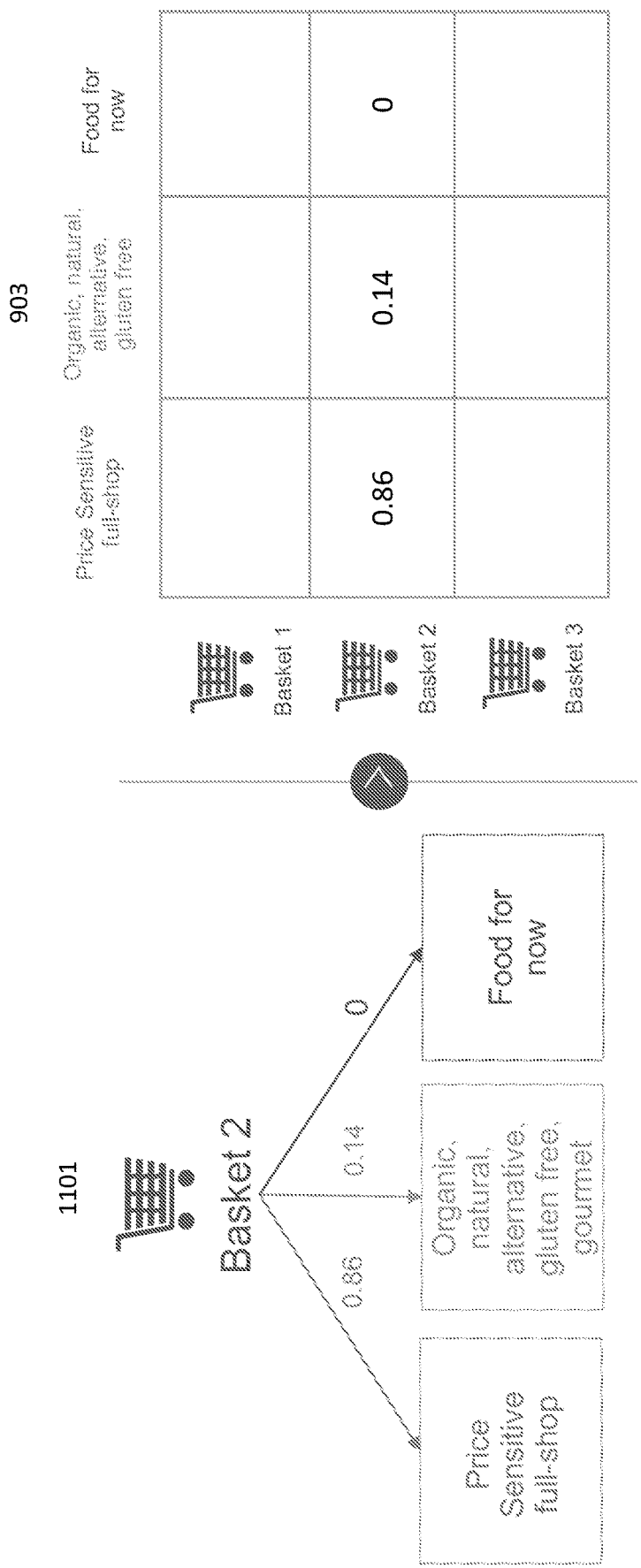
FIG. 11 illustrates the approximation of the probability that a given basket is associated with a specific mission in accordance with an embodiment.
Figure 12:
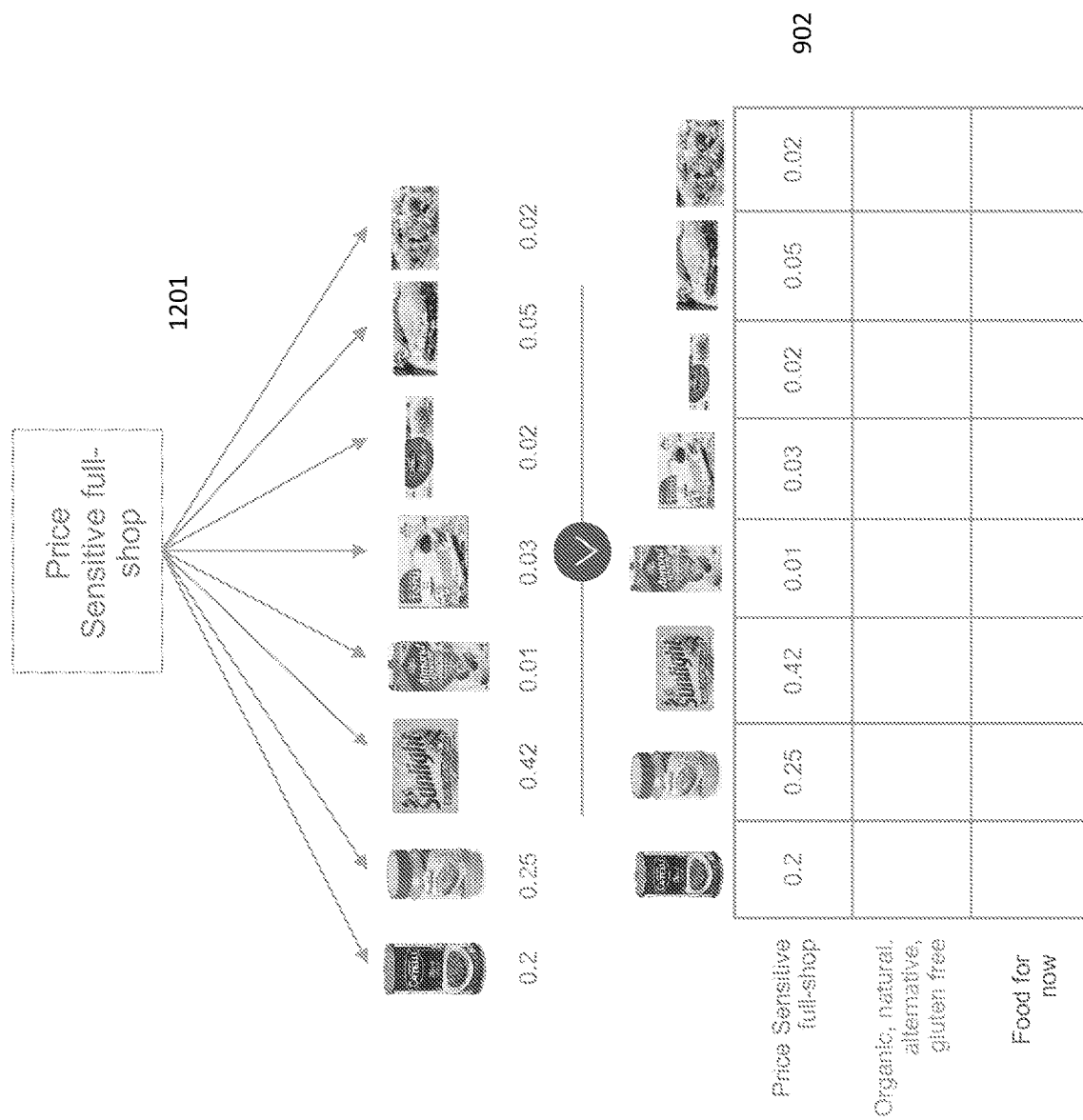
FIG. 12 illustrates the approximation of the probability that a given item belongs to a mission in accordance with an embodiment.

Referring to FIG. 11, the machine learning algorithm may approximate the probability that a given basket is associated with a specific mission 1101 in accordance with an embodiment. Similarly, referring to FIG. 12, the machine learning algorithm may approximate the probability that a given item belongs to a mission in accordance with an embodiment. As previously discussed in reference to FIG. 9, the product of the approximated values for the probability that an item belongs to a mission 902 and the probability that mission belongs to a basket 903 provides an approximated probability of any given item appearing in a specific basket.

Figure 13:
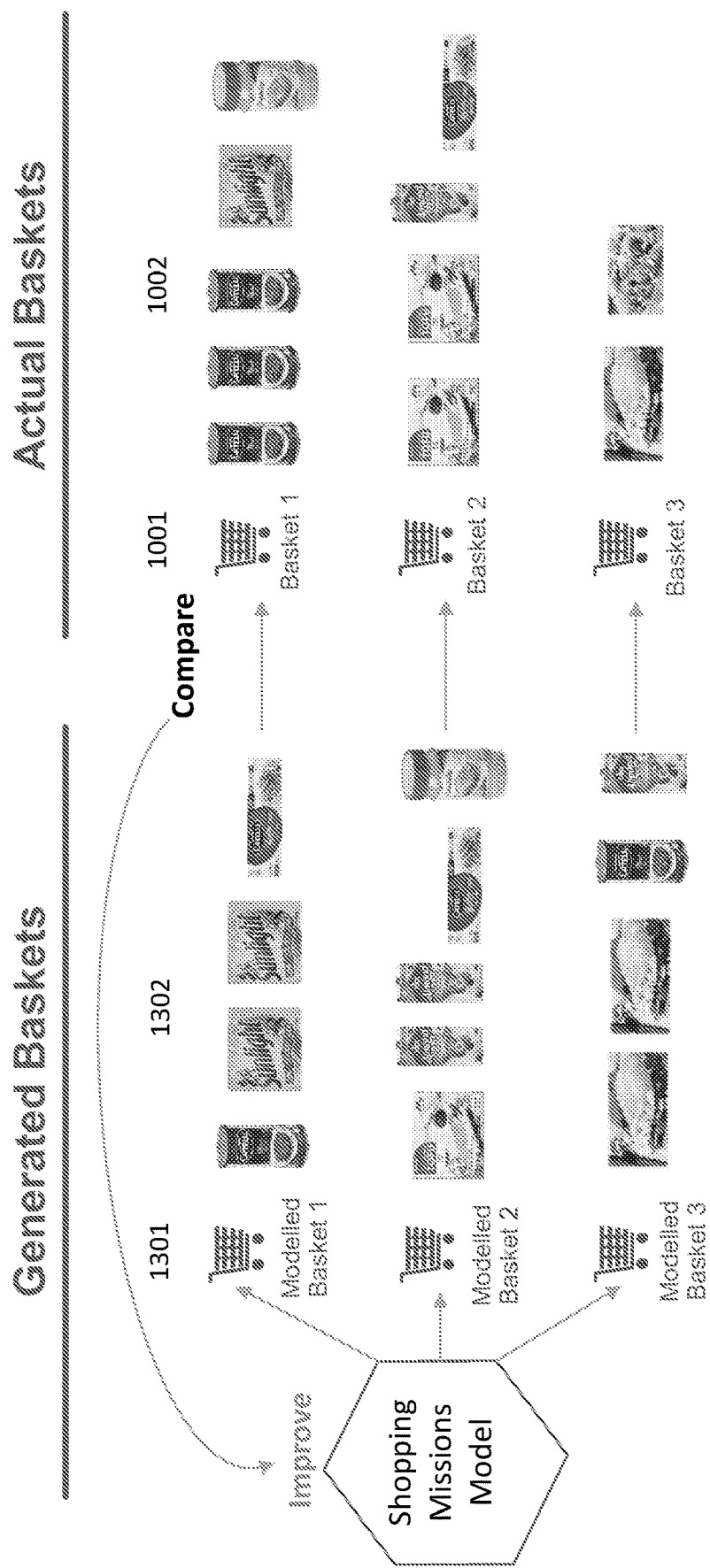
FIG. 13 illustrates an iterative process for improving a model for generating baskets in accordance with an embodiment.

Referring to FIG. 13, an iterative process for improving a model for generating baskets is illustrated in accordance with an embodiment. In a certain embodiment, an approximated basket 1301 comprising one or more items 1302 may be compared to an actual basket 1001 comprising one or more items 1002 as derived from transactional data. In some embodiments, the comparison may comprise generating a numerical representation of each basket. In further embodiments, the numerical representations may be generated using a natural language processor configured to calculate the "topic" of the basket. In some embodiments, the model may be iterated over varying increments of total shopping mission categories.

The systems and methods described herein have multiple use cases. Shopping missions can be utilized for targeting and evaluation in retail. In some embodiments, targeting may be based on a portion of a customer base. As an example, a flyer may be generated based on the shopping mission producing the most revenue for a given store. In other embodiments, targeting may be customized on a customer-by-customer basis.

Figure 14:
FIG. 14 illustrates a method of predictive modelling for future shopping missions in accordance with an embodiment.

Referring to FIG. 14, a method of predictive modelling for future shopping missions is illustrated in accordance with an embodiment. In some embodiments, transactional data may comprise identifying information associated with the customer. In further embodiments, historical shopping missions may be identified in the transactional data using the methods described herein. In a certain embodiment, historical shopping missions may be ordered in a timetable 1400. A specific user 1401 may have a pattern in the schedule associated with their historical shopping missions 1402. In some embodiments, the pattern may allow the system to predict at least of the time or type of a future shopping mission 1403. In further embodiments, an automated action 1404 may be taken, concerning the customer, based on the prediction 1403. In some embodiments, the action 1404 may comprise a dynamic message generated for the customer. In further embodiments, generating a dynamic message comprises at least one of transmitting an email, SMS message, application push, webpage push, webpage serve request, inbound phone call, outbound phone call, or mailer. In some embodiments, the action 1404 may comprise automatically generating a shopping list for the customer. It should be noted, that a shopping mission pattern may follow a consistent schedule (e.g., weekly, monthly, every 12 days, etc.) and/or ordered trends. As an example, a customer may typically have routine refills mission every week, but if the customer has a small top-up mission instead, they will typically have a very large full-shop the following week.

In certain embodiments, shopping missions may be used as an evaluation tool for determining an optimal store location or ad campaign success.

Example Scripts

An example python script for calculating a TFIDF matrix utilizing transaction data is presented:

```
def create_tfidf(
    train: SparkDataFrame,
    test: SparkDataFrame,
    inputCol: str,
    outputCol: str,
    minDF: int,
    vocabSize: int,
) -> tuple:
    # TF
    cv = CountVectorizer(
        inputCol=inputCol,
        outputCol="raw_features",
        vocabSize=vocabSize,
        minDF=minDF,
    )
    cvmodel = cv.fit(train)
    result_cv_train = cvmodel.transform(train)
    result_cv_test = cvmodel.transform(test)
    # IDF
    idf = IDF(inputCol="raw_features", outputCol=outputCol)
    idfModel = idf.fit(result_cv_train)
    result_tfidf_train = idfModel.transform(result_cv_train)
    result_tfidf_test = idfModel.transform(result_cv_test)
    return cvmodel, idfModel, result_tfidf_train, result_tfidf_test
```

An example python script for tuning the number of mission defined by an LDA model is presented:

```
def create_lda_iterator(
    train_df: SparkDataFrame, max_topics: int, max_iterations: int
) -> LDA:
    lda = LDA(seed=1, optimizer="em")
    lda.setMaxIter(max_iterations)
    # Create list of different number of topics to iterate over based on max
    params = [ ]
    for i in range(1, max_topics):
        param = {lda.k: i + 1}
        params.append(dict(param))
    model_iterator = lda.fitMultiple(train_df, params)
    return model_iterator
```

An example python scrip for determining a shopping mission for a new basket is presented:

```
def tag_mission_to_basket(
    df: SparkDataFrame, model: DistributedLDAModel
) -> SparkDataFrame:
    # score the DataFrame to tag a basket with a mission
    df_mission = model.transform(df)
    df_mission = df_mission.withColumnRenamed("id", "TRANSACTION_RK")
    # Get the mission based on the index of the maximum value of the topicDistribution
    max_index = F.udf(lambda x: x.tolist( ).index(max(x)), IntegerType( ))
    df_mission = df_mission.withColumn("mission", max_index("topicDistribution")).drop(
        "features", "topicDistribution"
    )
    return df_mission
```

Example Embodiments

An example python script for calculating a TFIDF matrix utilizing transaction
Identifying Item Substitutions Typical methods of analyzing and presenting products, in a retail environment, rely on broad product categorization centered on branding. Branding, though important to the consumer, does not fully encapsulate the consumer decision-making process. Current methods for consumer-centric product categorization may only incorporate information generated from surveys. Surveys may suffer from issues of reliability and validity. Systems and methods are needed for capturing the consumer decision-making process and need states to better inform product presentation.

Figure 15:
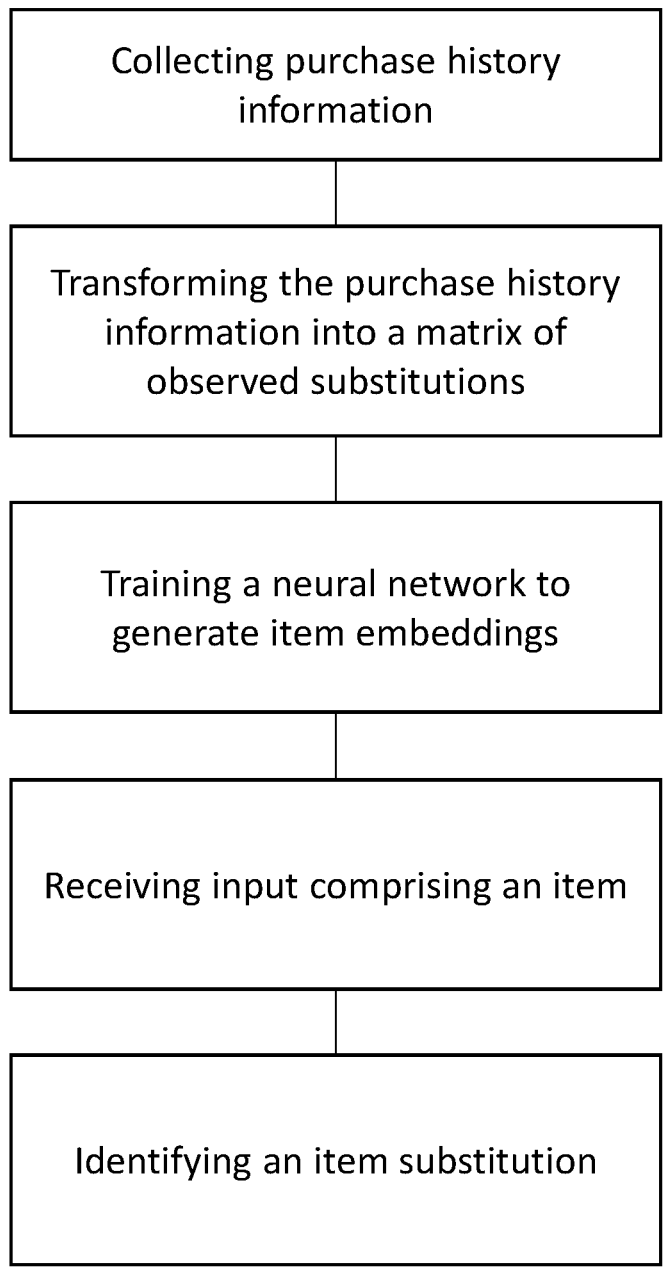
FIG. 15 depicts a flow diagram of a method for identifying an item substitution in accordance with an embodiment.

Referring to FIG. 15, a flow diagram for a method of identifying an item substitution 1500 is depicted in accordance with an embodiment. In certain embodiments, the method 1500 may include collecting purchase history information 1501. In some embodiments, the purchase history information may include purchase history from one or more customers. In further embodiments, the one or more customers may represent a target demographic. In some embodiments, a target demographic may be selected based on any available customer information (e.g., home address, purchase location, age, date/time of purchase, average shopping episode cost, average shopping episode margin, customer loyalty, etc.). In some embodiments, the purchase history may correspond to a single customer.

In certain embodiments, the purchase history information may catalog one or more purchased items. In some embodiments, the purchased items may be encoded in the purchase history information. In further embodiments, the purchased items may be referenced via stock-keeping units (SKUs). An SKU is a number that may be used to differentiate products and/or track inventory. Products may be assigned different SKU numbers based on various characteristics such as, but not limited to: price, manufacturer, color, style, type, or size, or any combination thereof. An SKU may be generated using an SKU generator. An SKU may be read using a scanner (e.g., a barcode reader or RFID reader). In some embodiments, the purchase history information may associate each purchased item with a shopping episode. As an example, the information from each receipt may be stored in a database. In some embodiments, the purchase history information may associate each purchased item or shopping episode with a customer. In further embodiments, the information may include a customer identifier derived from a payment method (e.g., a credit or debit card) or a loyalty program. In some embodiments, the purchase history information may include demographic information associated with the customer. In some embodiments, the purchase history information may include additional information associated with the purchase, including at least one of a date, time, and purchase location. In some embodiments, the purchase information may include additional information associated with each of the purchased items including at least one of a price, a margin, or a discount status.

Figure 16:
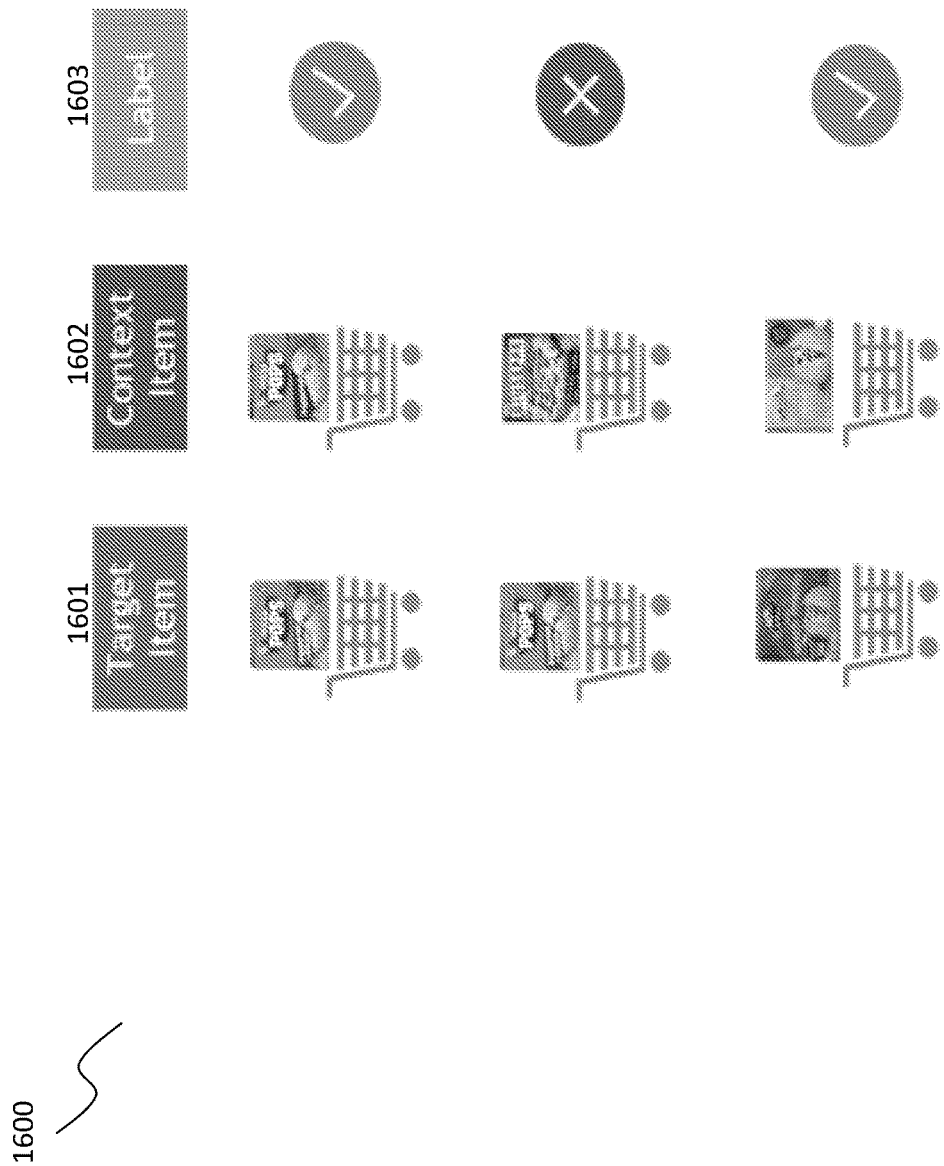
FIG. 16 illustrates a matrix of labeled observed substitutions in accordance with an embodiment.

In certain embodiments, the method 1500 may include transforming the purchase history information into a matrix of observed substitutions 1502. Briefly referring to FIG. 16, a matrix 1600 of labeled observed substitutions is depicted in accordance with an embodiment. In some embodiments, the matrix may include target items 1601, context items 1602, or a label 1603 identifying the corresponding context item 1602 as a substitute for the corresponding target item 1601, or any combination thereof. In some embodiments, the target items 1601 may include a subset of all purchased items in the purchase history information. In some embodiments, each target item 1601 may be compared to context items 1602 including a subset of every other purchased item. In some embodiments, the label 1603 may be binary (e.g., 1 for positive pairing, 0 for a negative pairing). In some embodiments, a positive paring in the label 1603 may be identified when target item 1601 and context item 1602 were purchased by the same customer and/or never, or infrequently, purchased together. In some embodiments, the labeling of target items 1601 and/or context items 1602 may be performed on a customer-by-customer basis.

In certain embodiments, multiple matrices 1600 may be produced in batches. In some embodiments, a batch may include 32 entries. In some embodiments, positive parings may be prioritized for inclusion in a batch. In some embodiments, a sampling method may be employed to select negative parings. In further embodiments, the sampling method may be log uniform sampling such that more popular items are sampled more frequently. In some embodiments, multiple batches may be generated through the transformations described herein. In further embodiments, a specified number of batches may be generated.

In certain embodiments, the matrix 1600 may be stored as a matrix. In other embodiments, the matrix 1600 may be stored as a series of arrays representing the target items 1601, context items 1602, and labels 1603. A person of ordinary skill in the art will recognize that the matrix could be stored and reduced in multiple manners.

Figure 17:
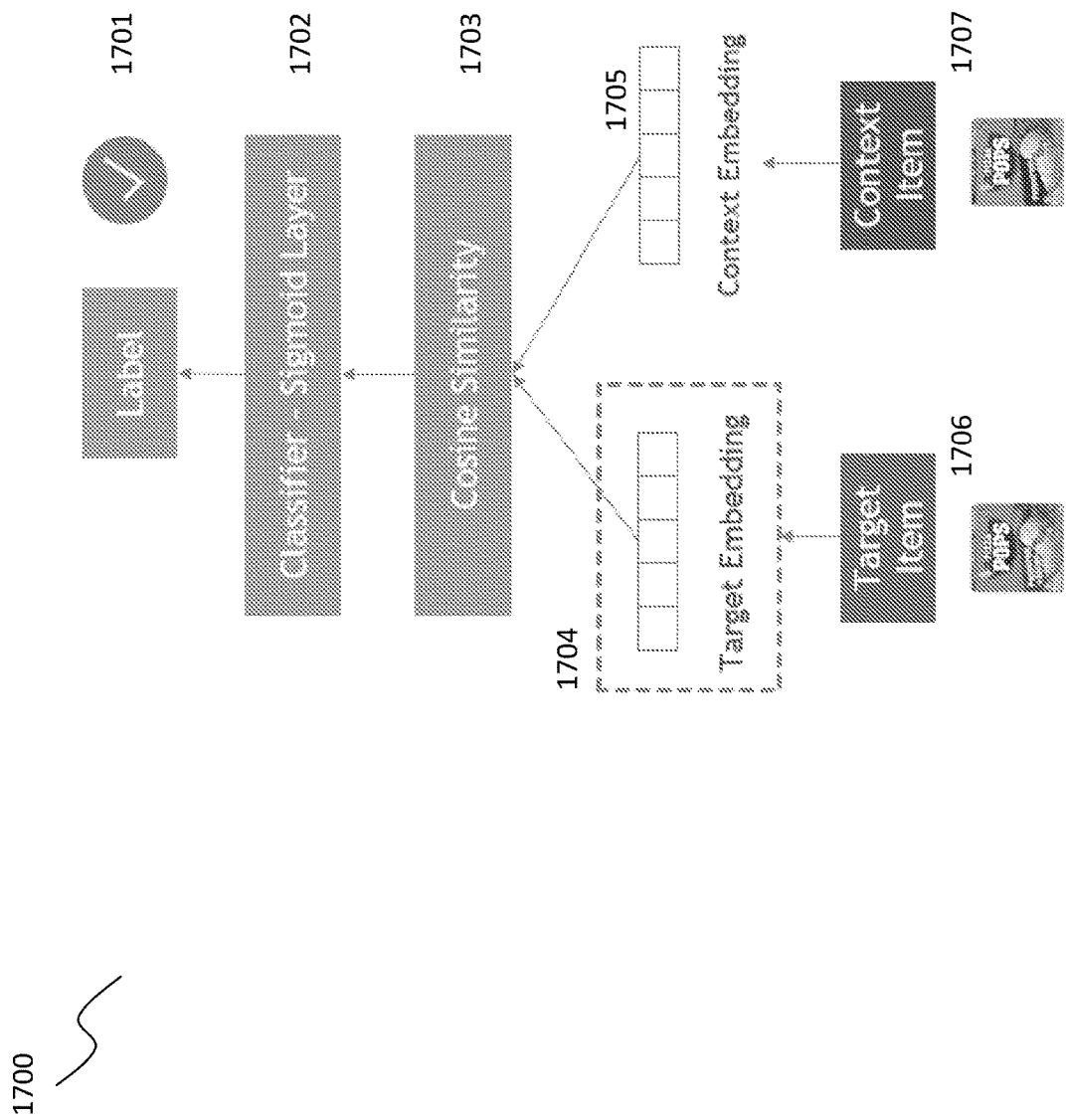
FIG. 17 depicts a flow diagram of a method for generating item embeddings in accordance with an embodiment.

In certain embodiments, the method 1500 may include training a neural network to generate item embedding 1503. Embeddings (e.g., vector representations of items) can transform something with a large number of dimensions (e.g., whether or not an item is one of many thousands of possibilities) to a smaller number (e.g., 100 numbers, where the similarity between items has real-world meaning). In some embodiments, the neural network is trained on the observed substitutions matrix 1600. The neural network may be trained to predict the likelihood of a target item and a context item being substitutes. Briefly referring to FIG. 17, an example flow diagram of a machine learning algorithm for generating item embeddings 1700 is depicted in accordance with an embodiment. In some embodiments, a target item 1706 and/or a context item 1707 may be one-hot encoded and transferred into a vector embedding. In some embodiments, the embeddings can be a sequence of numbers (e.g., 100 numbers, or any other amount of numbers). In some embodiments, the vector embeddings may have a length of 256. In some embodiments, the initial target embedding 1704 and context embedding 1705 may be random.

In certain embodiments, the machine learning algorithm 1700 may converge the target embedding 1704 and context embedding 1705 to similar values when the items are positive pairs. In some embodiments, the machine learning algorithm 1700 may diverge the target embedding 1704 and context embedding 1705 to distant values when the items are negative pairs. As an example, Customer A may frequently purchase one of a variety of healthy crackers, and one of a variety of potato chips together in a shopping episode. Customer B may frequency purchase just one of either a cracker or potato chip in a shopping episode. As a result, the neural network may closely converge the embedding values for each type of healthy cracker, and each type of potato chips, while less closely converging the embedding values for the healthy crackers and the potato chips.

In certain embodiments, training the machine learning algorithm 1700 may include determining a similarity between the target embedding 1704 and the context embedding 1705. In some embodiments, determining a similarity may include calculating a cosine similarity 1703 between the target embedding 1704 and the context embedding 1705. Embeddings which are very close may have a cosine similarly close to 1.

In certain embodiments, training the machine learning algorithm 1700 may include classifying the context item 1707 as a substitute of the target item 1706. In some embodiments, the classifier may transform the similarity value into a probability that the context item 1707 is a substitute of the target item 1706. In further embodiments, the classifier may include a threshold or function for mapping the probability to a classification. In some embodiments, the classifier may be a sigmoid function 1702.

In certain embodiments, the classified value may be compared to the label 1701 to optimize the machine learning algorithm 1700. In some embodiments, a loss function may be used to optimize the algorithm 1700. In further embodiments, the loss function may be a binary cross entropy loss function. A person of ordinary skill in the art will recognize that alternative similarity metrics, classifiers, and/or optimization functions may define an embedding vector space with similar properties.

Referring back to FIG. 15, the method 1500 may include receiving input comprising an item 1504. In some embodiments, the method 1500 may include identifying a substitution of the item 1505. In some embodiments, identifying a substitution may include identifying an item, from a subset of all items with embeddings, with the closest embedding to the received item 1504. In some embodiments, identifying a substitution may include identifying an item, from a subset of all items with embeddings, within a threshold range to the received item 1504. In some embodiments, multiple substitution items may be identified.

Figure 18A:
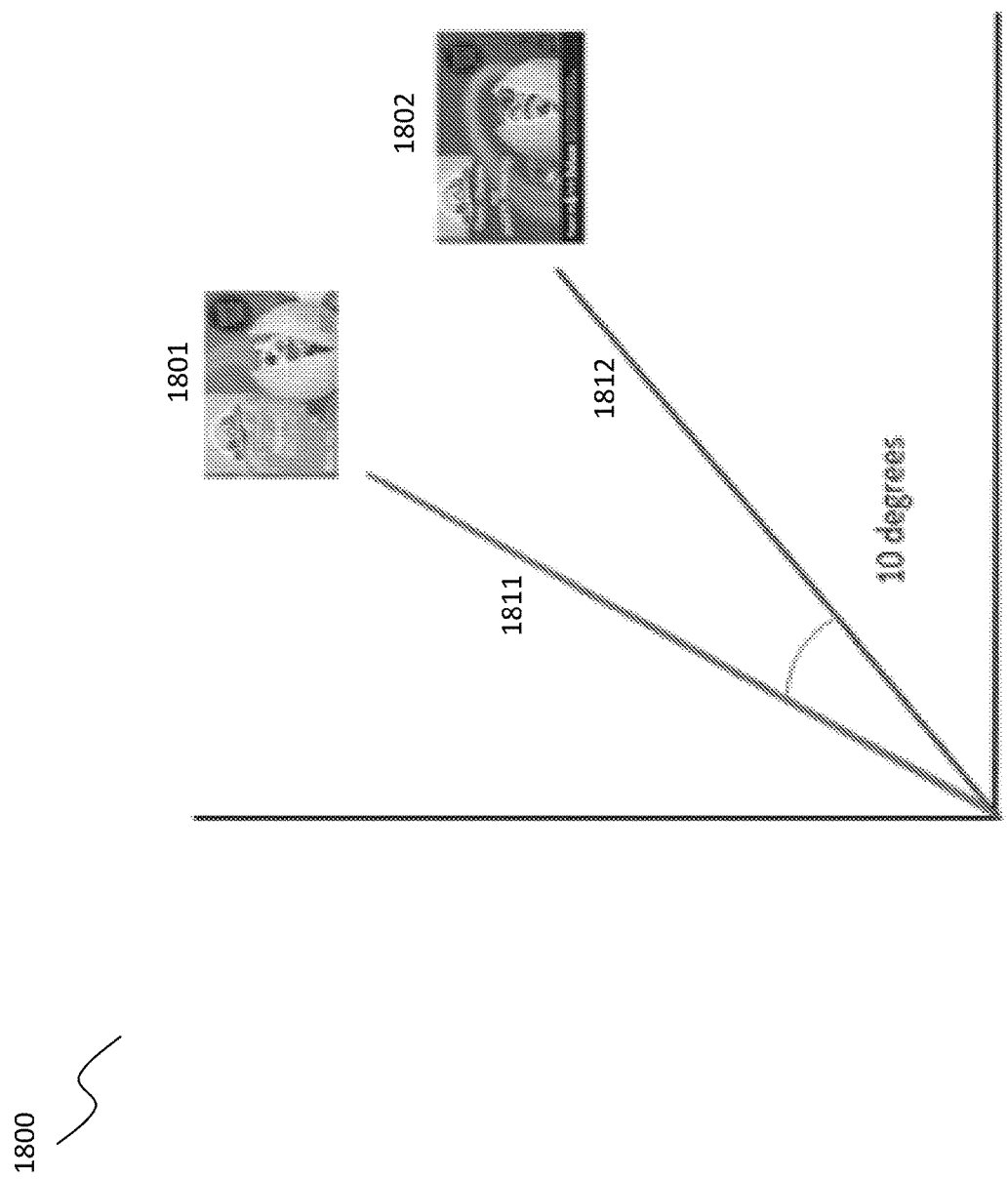
FIG. 18A illustrates a similarity calculation between two items in a vector space in accordance with an embodiment.

Referring to FIG. 18A, an example similarity calculation between two items in a vector space 1800 is illustrated in accordance with an embodiment. In some embodiments, the similarity calculating may be include determining a cosine similarity. In the example, item 1801 has an embedding 1811 which is 10 degrees from item 1802 embedding 1812. The cosine of 10 is 0.98 suggesting a similarity of 98%.

Referring to FIG. 18B, an example similarity matrix is depicted in accordance with an embodiment. In some embodiments, the calculated similarity between some subset of the items in the vector space is stored in a similarity matrix. In some embodiments, identifying an item substitution may include looking up the highest similarity values in a column or row associated with the given item.

Figure 19:
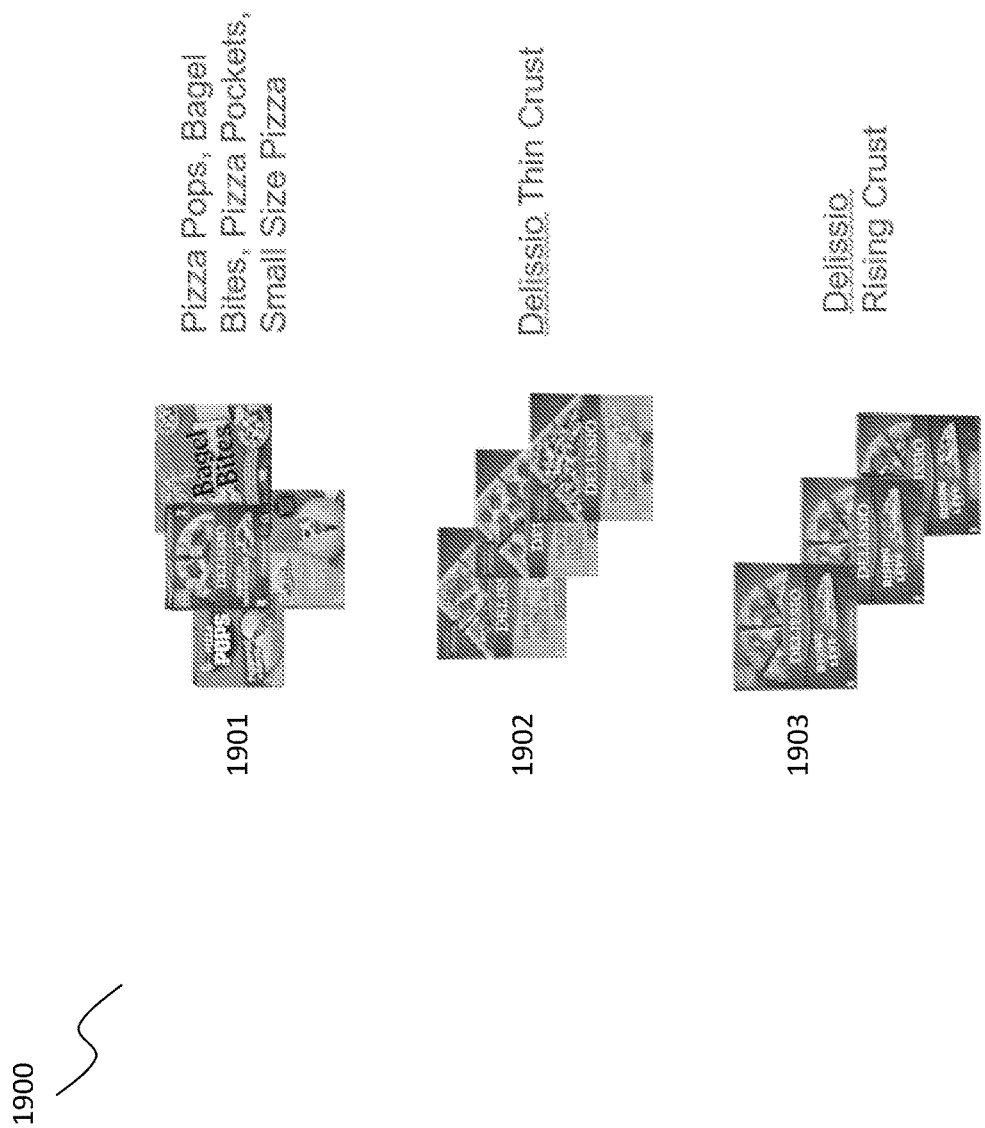
FIG. 19 illustrates an example item clustering based on item similarity in accordance with an embodiment.

In certain embodiments, clustering may be performed on a set of similarity data, such as a similarity matrix, to determine need states. As a need state defines a set of items fitting a specific customer need (e.g., the items are substitutions), a need state may cross brands and price points. In some embodiments, the clustering model may be hierarchical clustering. FIG. 19 depicts a set of example needs states determined for frozen pizza 1900. The example need states appear to suggest that customers treated kids and snack-size pizzas 1901 as substitutions, but purchased larger pizza based on crust 1902/1903.

In certain embodiments, a set of similarity data, such as a similarity matrix, may be used to generate a customer decision tree. A customer decision tree may depict the decisions an average customer makes in choosing an item from a set of similar items in a tiered manner based on the similarity of the items. In some embodiments, a customer decision tree may illustrate item similarity through a dendrogram. In some embodiments, need states may be derived from the customer decision tree. In further embodiments, deriving need states from the customer decision tree may include determining a threshold difference in similarity between items. In other embodiments, needs states may be derived by a clustering model. In some embodiments, need states may be derived from a hierarchal tier threshold in the customer decision tree.

Figure 20:
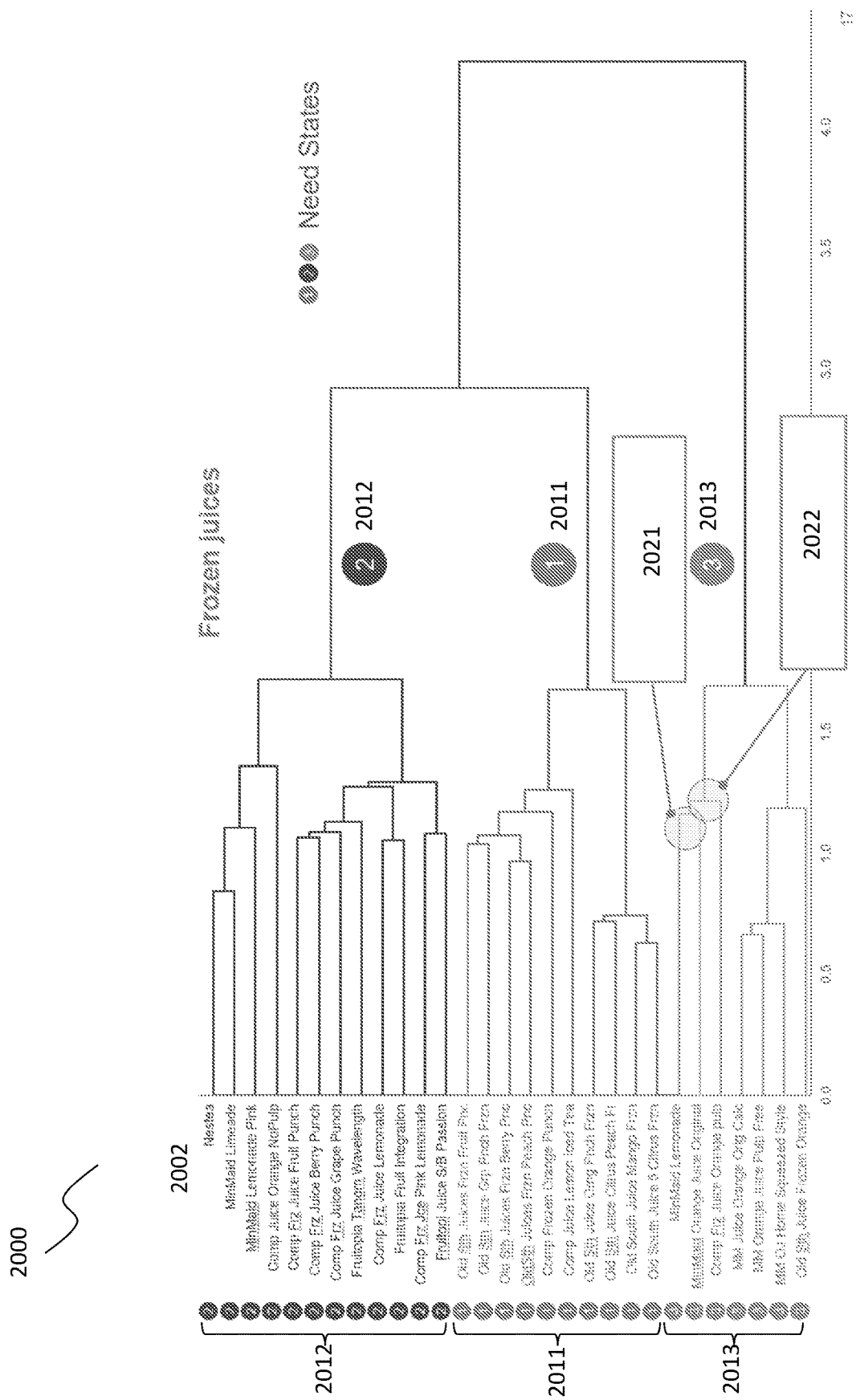
FIG. 20 illustrates a customer decision tree based on item similarity in accordance with an embodiment.

FIG. 20 illustrates an example customer decision tree 2000 in accordance with an embodiment. The customer decision tree 2000 depicts the taxonomic relationship between a set of items 2002 based on their similarity. In the example, three need states 2011/2012/2013 are defined. As depicted in the customer decision tree 2000, the items in Need State One 2011 are more similar to the item in Need State Two 2012 than the items in Need State Three 2013. The customer decision tree branches based on the level of similarity between the items in each branch. As an example, a single brand's lemonade and original orange juice were substituted more often 2021 than either of those products with another brand of frozen orange juice 2022.

The systems and methods described herein may provide useful metrics for managing one or more storefronts. As an example, need states may be used to optimize product placement and spacing in a store to aid in or promote certain customer decisions. In other examples, need states may be applied to improve the personalization and optimization of offers and promotions.

Example: Store Facing Elasticity Curves

Figure 21:
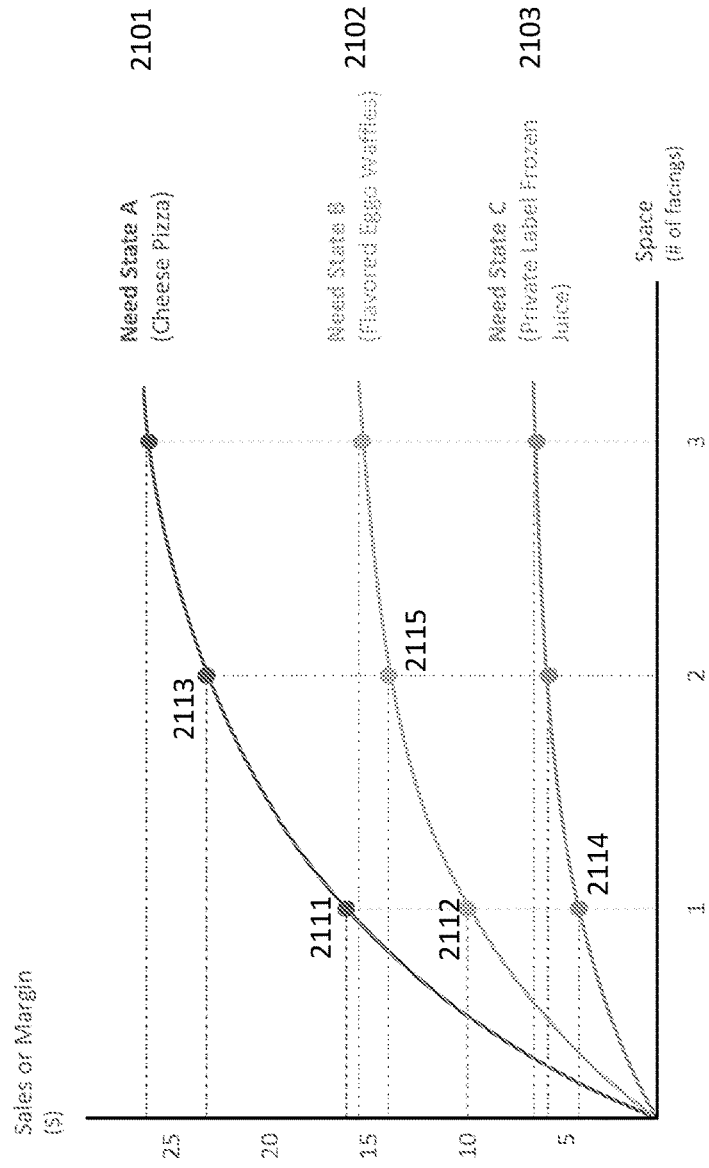
FIG. 21 illustrates the graphical relationship between sales and spacing for a set of example need states in accordance with an embodiment.

FIG. 21 illustrates example space elasticity curves 2100 for three need states. Each need state can be logged to determine a relationship between the sales and/or margin of the items in the need state versus the number of spacings the item is provided in the store. In some embodiments, the sales and/or margin may be normalized (e.g., over time). Spacings may then be chosen based on the highest incremental change in sales/margin for the number of spacings. In the example, five spacings are available. The elasticity curves 2100 suggest that Need State A 2101 should be chosen for the first spacing due to having the highest sales/margin of $16.00 2111. Need State B should be chosen for the second spacing with the highest remaining sales/margin of $10.00 2112. As the incremental change in sales/margin for Need State A having two spacings 2113, at $7.00 ($23.00−$16.00) is still higher than Need State C at one spacing 2114, at $4.00, Need State A should also receive the third spacing. The method may continue to assign any remaining spaces (i.e., to Need Space C 2114 and then Need Space B 2115).

Example: Store Facing Arrangement

In most stores, items can be predominantly arranged by brand. FIG. 22 illustrates a product adjacency example 2200 comparing arranging items by brand 2201 and by need state 2202 in accordance with an embodiment. Arranging a store by need state 2202 may benefit the customer by placing all relevant items to a decision in front of them at once. Arranging a store by need state 2202 may benefit the store by providing the store greater control in presentation of the store's facings to the customer. For example, a store may be able to better highlight a private label item, with a higher margin, in direct comparison to other similar products in the same need state.

Example: Offer Personalization

Need states may be used to improve offer personalization. A personalized offer may comprise generating a personalized digital marketing message. Digital marketing message may be transmitted through emails, SMS messages, webpages, applications, and phone calls. A system for generating marketing messaging is disclosed in U.S. Provisional Application No. 63/362,351. Such systems may filter or sort a series of items based on one or more attributes. A need state may be used as an attribute in said system. As a filter, need states may be used to automatically identify conflicting items in a message. For example, a customized message may be generated to market 10 products to a consumer. In the process of identifying the 10 items, the system may rank all items based on a set of rules. The system may then filter out any redundant items with the same need state. In other words, if the third and sixth highest ranked items were both in the need state "thin crust pizza," the sixth ranked item may be omitted from the list. As a sorting element, need states may be able to identify substitutions to items a consumer generally buys. For example, for a consumer that buys a specific brand item in the "thin crust pizza" need state commonly, a message may be generated which highlights that an alternative "thin crust pizza" brand is on sale this week or simply offer an alternative with a higher margin to the retailer.

Additionally, need states may simplify the processing required to identify items. Instead of sorting each SKU in a database, a system may evaluate a smaller set of need states. The personalized message may either recommend the need state itself, or one or more items within the need state. Purchase information associated with a need state may be stored in a database or derived from information associated with individual items. For example, a system may track the time since a customer bought a product in a need state.

Example: Promotion Optimization

Needs states may be used to optimize promotions. Promotions may be scheduled and generated based on interaction with a brand and/or the consumer. An issue with current methods of generating promotions is cannibalization of sales market (i.e., multiple products in similar spaces competing in the same promotional window). For example, a store may choose to not feature promotions for multiple items of the same need state in a marketing message, like a flyer. The store may set a time interval before featuring another item of the same need state again. In another example, a retail chain may inform a brand of scheduled promotions in the same need state to aid in scheduling the brand's promotion.

Example: Item Ranges

The system can identify whether there are excessive and/or inadequate items in a range of items from the density of items within a need state. For example, the system can analyze if there many items within the need state or only a few and/or one item. If a need state features many items, market share can be spread between the similar items within the need state. For example, if an Asian market sells 25 different types of Korean noodles that are very similar, customers are likely buying a random type of noodle. Thus, the store could cut down from 25 to 2 or 3, and customers may not care. If a need state only features a few items, a store can add an additional item, such as a home brand, to the need state. The system can identify an average amount of items per need state across all need states to provide a threshold for excessive and/or inadequate items in a need state. The average can be normalized based on the number of sales and/or average margin of the need state.

The system can also identify exclusivity and/or market share of an item based on sales and the density of items within a need state.

Example: Pricing

The system can identify pricing optimizations for items within a need state. Changes to pricing of an item within a need state can affect sales of other items within the need state. For example, if item A within a need state is on sale, item A may sell more units, while item B, within the same need state sells less. The system can find the optimal price for an item (e.g., a home brand) to maximize margin and sales within a need state. It should be noted that an extensive price change may cause an item to change need states.

Example: Loss and Categorical Accuracy

Referring to FIG. 23, a graph 2300 of model loss over time, for an example dataset, is depicted in accordance with an embodiment. Time is depicted in epochs (i.e., an iteration of training the model). In this example, the model loss for the algorithm decreased and then converged to a moderately consistent value between 100 and 200 epochs. A person of ordinary skill in the art will recognize that by changing the parameters of the machine learning algorithm, different values of model loss may exist during iterative training. The example graph 900 is presented merely to illustrate the convergent nature of the solution.

Figure 24:
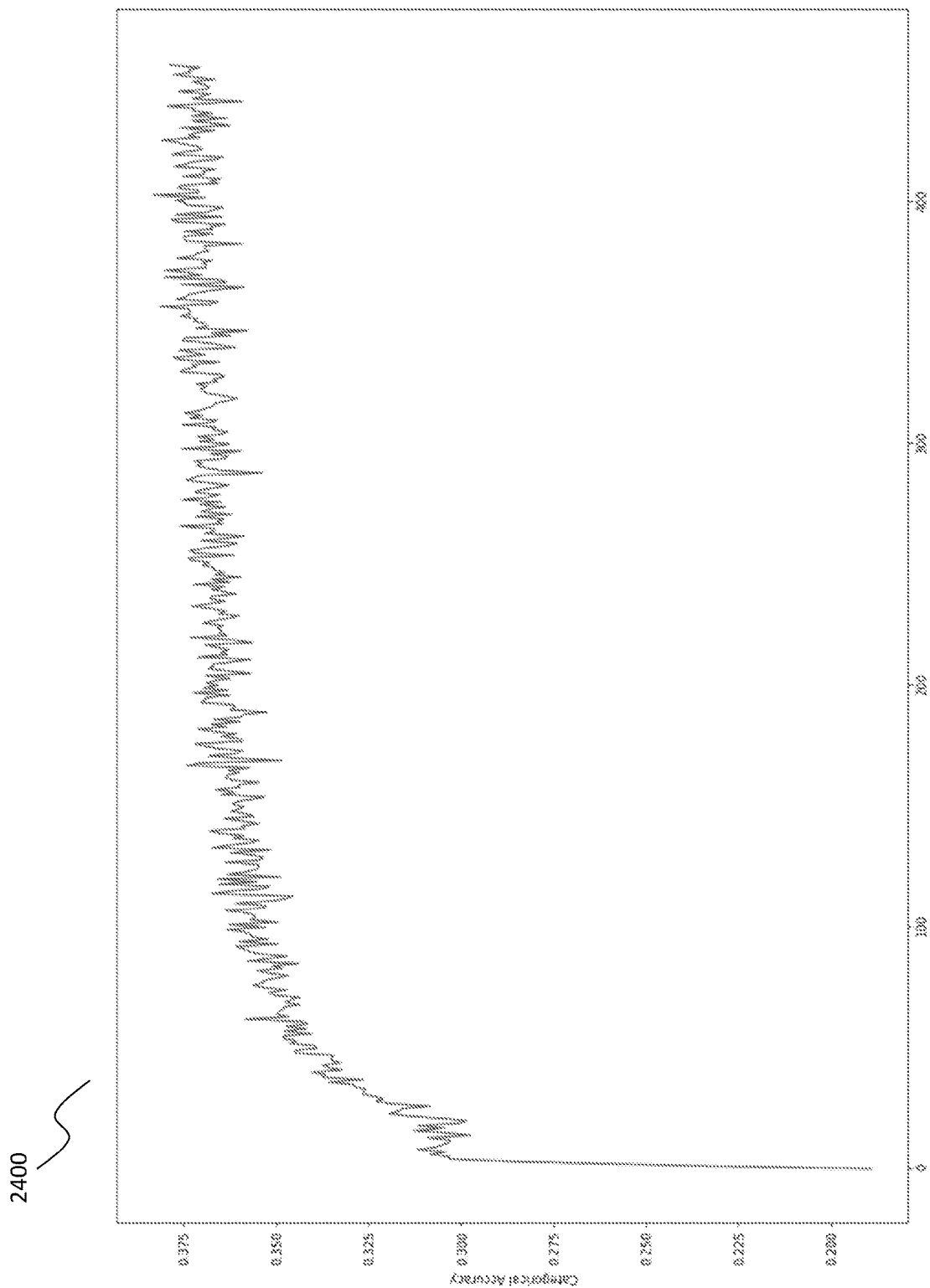
FIG. 24 depicts a graph of accuracy over time, for an example dataset, in accordance with an embodiment.

Referring to FIG. 24, a graph 2400 of accuracy over time, for an example dataset, is depicted in accordance with an embodiment. Time is depicted in epochs. In this example, the accuracy for the algorithm increased and then converged to a moderately consistent value between 100 and 200 epochs. A person of ordinary skill in the art will recognize that by changing the parameters of the machine learning algorithm, different values of accuracy may exist during iterative training. For example, a larger window for similarity between items of the same need state may increase accuracy at the expense of granularity. The example graph 2400 is presented merely to illustrate the convergent nature of the solution.

Example Code

Example functions are provided for illustrative purposes. The definition of a function is provided which can transform purchase history information into training data:

```
def generate_training_data(
    batch_size: int,
    sequences: list,
    window_size: int,
    num_ns: int,
    num_prods: int,
    seed: int,
    max_num_items: int,
    shuffle=True,
) -> tuple:
```

"""Generator function can yield batches of training data containing lists of target products, context products and labels Parameters
---
batch_size: int
    Size of the batch to yield
sequences: list
    List of baskets and unique items purchased in each
window_size: int
    Size of the window selecting for context products—for this use case window
    Size can be the length of the basket but to speed up training a smaller window is recommended
num_ns: int
    The number of negative samples to select per positive sample
num_prods: int
    The number of unique products in the product dictionary
seed: int
    The seed for the negative sampling
max_num_items: int
    The maximum number of items to consider for each customer, used to speed up training
shuffle: bool
    Controls whether the sequence of customers should be shuffled between batches (defaults to True)
Returns
---
targets: list
    List of target products
contexts: list
    List of context products (including negative samples)
labels: list
    Binary 0/1 indicator if the target/context pair were a positive sample (1) or negative sample (0)
"""""

A function is provided which can generate embeddings:

```
contexts=Input(shape=(None,self.num.ns+1,1))

targets=Input(shape=(None,))
```

Embedding for the Target Product

```
target_embedding=Embedding(self.num_prods,self-
    ._embedding_size,input_length=1, name=self._item_embeddings_layer_name)(targets)
```

Embedding for the Context Product

```
context_embedding=Embedding(self._num_prods,
    self._embedding_size,input_length=self.num_ns)
    (contexts)
```

The definition of a function is provided which can determine similarity between
items:
def    calc_cosine_sim(df:    SparkDataFrame)→Spark-DataFrame:
"""""
Generates cosine similarity between items given a DataFrame with an ITEM_NO and embedding vector
Parameters
---
df: str
    The DataFrame containing the ITEM_NO and embedding vector
Returns
---
cosine_out: SparkDataFrame
    DataFrame containing the cosine similarity between items
"""""
The definition of a function is provided which can generate a similarity matrix:
def create_dist_matrix(df: SparkDataFrame)→DataFrame:
"""""Create a Pandas DataFrame containing the distance matrix of cosine similarity for input into Hierarchical Clustering
Parameters
---
df: pyspark.sql.dataframe.DataFrame
    PySpark DataFrame containing the cosine similarity scores between two items
Returns
---
final_df_pivot: DataFrame
    Pandas DataFrame containing the distance matrix of cosine similarities
"""""
The definition of a function is provided which can generate need states and a customer decision tree:

```
def create_dendro(
    dist_matrix: DataFrame
    linkage_method: str,
    prod_path: str,
    color_thresh: float,
    generate_need_states: bool,
    need_state_cut_point: int,
) -> tuple:
```

"""""Create a dendrogram from the distance matrix
Parameters
---
dist_matrix: DataFrame
    Distance matrix containing the cosine similarity between items as a Pandas
DataFrame
    linkage_method: str
        The method to use for the linkage matrix
prod_path: str
    Path to the product hierarchy
color_thresh: int
    The threshold on which to color different clusters on the dendogram
generate_need_states: bool
    Boolean to control if need lookup tables should be generated
need_state_cut_point: int
    Cut point to generate need states
Returns
---
plt: matplotlib.pyplot
    matplotlib plot object
need_state_df: DataFrame
    DataFrame containing the item and need state number lookup
"""""

Example Embodiments

In some aspects, the techniques described herein relate to a computer-implemented method of identifying item substitutions including: collecting purchase history information, wherein the purchase history information includes one or more shopping episodes from one or more customers, wherein each shopping episode includes one or more purchased items; transforming the purchase history information into a matrix of observed substitutions; training a neural network on the matrix of observed substitutions to generate item embeddings; receiving input including an item; identifying a substitution similarity between the item and another item based on the item embeddings.

In some aspects, the techniques described herein relate to a computer-implemented method, wherein each item embedding corresponds to an item transformed into a vector within an n-dimensional space.

In some aspects, the techniques described herein relate to a computer-implemented method, wherein the item embeddings define a vector space configured such that items that are closer in the vector space are observed substitutions.

In some aspects, the techniques described herein relate to a computer-implemented method, wherein transforming the purchase history information into a matrix of observed substitutions further includes: creating a set of paired items; and qualifying the paired items on whether the paired of items were both bought by one of the one or more customers in different shopping episodes.

In some aspects, the techniques described herein relate to a computer-implemented method, further including qualifying the paired items as never purchased in the same shopping episode.

In some aspects, the techniques described herein relate to a computer-implemented method, wherein the set includes samples of more popular items more frequently.

In some aspects, the techniques described herein relate to a computer-implemented method, wherein identifying a substitution similarly between the item and another item based on the item embeddings further includes calculating a cosine similarity between the item and a potential substitution.

In some aspects, the techniques described herein relate to a computer-implemented method, further including generating a similarity matrix including the similarity between all items.

In some aspects, the techniques described herein relate to a computer-implemented method, further including generating a dendrogram, based on the similarity matrix, configured to represent a categorization of items based on decisions made by the one or more customers.

In some aspects, the techniques described herein relate to a computer-implemented method, further including clustering the similarity matrix to generate one or more customer need states.

In some aspects, the techniques described herein relate to a computer-implemented method, further including: receiving information associated with one or more spacings of a store; and determining an optimal item allocation within the one or more spacings based on the customer need states.

In some aspects, the techniques described herein relate to a computer-implemented method, further including: receiving information associated with the layout of a store; and determining an optimal item arrangement within a layout based on the customer need states.

In some aspects, the techniques described herein relate to a computer-implemented method, wherein training on the neural network on the matrix of observed substitutions to generate item embeddings further includes: iteratively converging a first item embedding and a second item embedding, responsive to the second item being observed as a substitute for the first item.

In some aspects, the techniques described herein relate to a computer-implemented method, further including initializing the first item embedding and second item embedding as a random value.

In some aspects, the techniques described herein relate to a computer-implemented method, further including automatically generating a customized marketing message based on the purchase history information and the purchased items' need states.

In some aspects, the techniques described herein relate to a computer-implemented method, further including determining an item density within a need state and identifying a range of items to be sold based on the item density.

In some aspects, the techniques described herein relate to a computer-implemented method, wherein the one or more purchased items are identified via a Stock Keeping Unit (SKU).

In some aspects, the techniques described herein relate to a computer-implemented method, further comprising accepting SKU information using a scanner.

In some aspects, the techniques described herein relate to a computer-implemented method, further comprising accepting need state information associated with one or more products, and customer information associated with a customer and historical customers, transforming the need state information and customer information into standardized attribute information, wherein the standardized attribute information comprises attributes associated with each of the one or more need states, storing the standardized attribute information; defining a message recipe based on the presence of a subset of the one or more attributes, ranking the one or more need states based on subset of the one or more attributes, defining a message action based on message and a message template, selecting one or more products based on the ranking of the one more need states, automatically generating a message comprising the message action and at least one of the one or more products, and transmitting the message to the customer over the network.

Example Data Processing System

Figure 25:
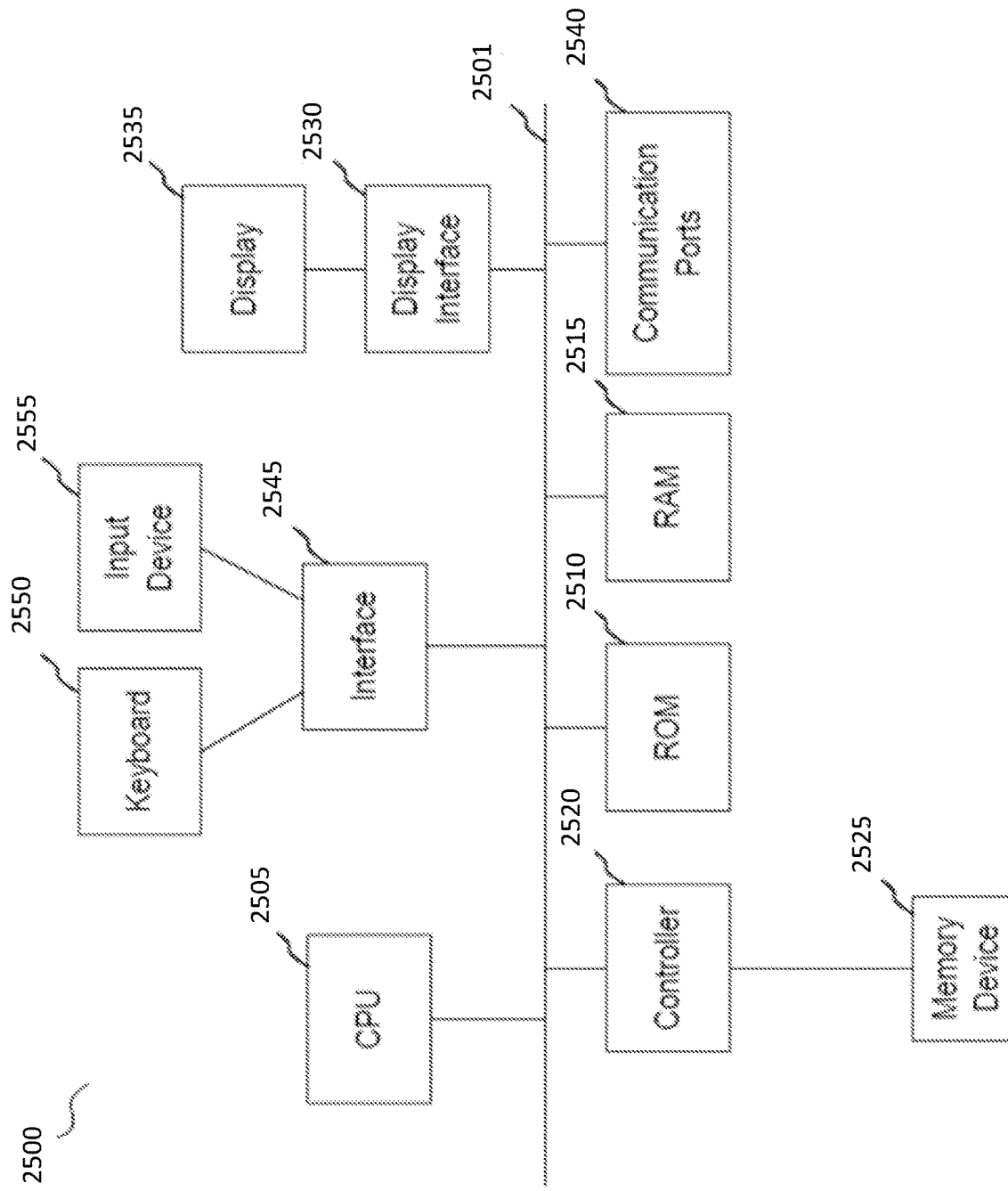
FIG. 25 depicts a block diagram of exemplary data processing system comprising internal hardware that may be used to contain or implement various computer processes and systems.

FIG. 25 depicts a block diagram of exemplary data processing system 2500 comprising internal hardware that may be used to contain or implement the various computer processes and systems as discussed above. In some embodiments, the exemplary internal hardware may include or may be formed as part of a database control system. In some embodiments, the exemplary internal hardware may include or may be formed as part of an additive manufacturing control system, such as a three-dimensional printing system. A bus 2501 serves as the main information highway interconnecting the other illustrated components of the hardware. CPU 2505 is the central processing unit of the system, performing calculations and logic operations required to execute a program. CPU 2505 is an exemplary processing device, computing device or processor as such terms are used within this disclosure. Read only memory (ROM) 2510 and random access memory (RAM) 2515 constitute exemplary memory devices.

A controller 2520 interfaces with one or more optional memory devices 2525 via the system bus 2501. These memory devices 2525 may include, for example, an external or internal DVD drive, a CD ROM drive, a hard drive, flash memory, a USB drive or the like. As indicated previously, these various drives and controllers are optional devices. Additionally, the memory devices 2525 may be configured to include individual files for storing any software modules or instructions, data, common files, or one or more databases for storing data.

Program instructions, software or interactive modules for performing any of the functional steps described above may be stored in the ROM 2510 and/or the RAM 2515. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 2530 can permit information from the bus 2501 to be displayed on the display 2535 in audio, visual, graphic or alphanumeric format. Communication with external devices can occur using various communication ports 2540. An exemplary communication port 2540 can be attached to a communications network, such as the Internet or a local area network.

The hardware can also include an interface 2545 which allows for receipt of data from input devices such as a keyboard 2550 or other input device 555 such as a mouse, a joystick, a touch screen, a remote control, a pointing device, a video input device and/or an audio input device.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

In this specification, "a" and "an" and similar phrases are to be interpreted as "at least one" and "one or more." References to "an" embodiment in this disclosure are not necessarily to the same embodiment. "Comprise", "included" and similar phases are to be interpreted as "include but not limited to".

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) software signature application. However, one skilled in the art will recognize that embodiments of the invention could be a malware detection application.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A computer-implemented method comprising:
    collecting history information, wherein the history information comprises one or more episodes from one or more customers, wherein each episode comprises one or more items of a collection of items;
    transforming the history information into standardized attribute information comprising one or more attributes comprising a matrix of observed substitutions, wherein an observed substitution comprises an alternative item;
    training a neural network on the matrix of observed substitutions to generate item embeddings receiving input comprising an item, wherein the neural network comprises a loss function for optimizing a machine learning algorithm;
    identifying a substitution similarity between the item and another item based on the item embeddings;
    automatically generating a message comprising at least one item of the collection of items based on a subset of the one or more attributes; and
    transmitting the message to the one or more customers over a network;
    wherein automatically generating a message based on the subset of the one or more attributes further comprises:
        defining a message recipe based on the subset of the one or more attributes;
        ranking the collection of items based on a subset of the one or more attributes;
        defining a message action based on the message recipe and a message template; and
        automatically generating the message comprising the message action and the at least one item of the collection of items based on the ranking.

2. The computer-implemented method of claim 1, further comprising:
filtering the collection of items based on the substitution similarity.

3. The computer-implemented method of claim 1, wherein the one or more attributes further comprise a category.

4. The computer-implemented method of claim 1, wherein the one or more attributes further comprise a price.

5. The computer-implemented method of claim 4, wherein the price comprises a discount.

6. The computer-implemented method of claim 1, wherein the one or more attributes further comprise a discovery score configured to score an affinity level for the customer for each of the collection of items.

7. The computer-implemented method of claim 6, further comprising:
determining the discovery score using collaborative filtering.

8. The computer-implemented method of claim 1, wherein the one or more attributes further comprise a popularity score of the collection of items.

9. The computer-implemented method of claim 8, wherein the popularity score is specific to one or more stores the customer has a shopping history.

10. The computer-implemented method of claim 1, wherein the one or more attributes further comprise a repurchase score.

11. The computer-implemented method of claim 1, wherein the one or more attributes further comprise a random element.

12. The computer-implemented method of claim 1, wherein ranking the collection of items based on a subset of the one or more attributes further comprises selecting a product quota based on the ranking of at least one attribute.

13. The computer-implemented method of claim 1, wherein transmitting the message to the one or more customers comprises at least one of transmitting an email, SMS message, application push, webpage push, webpage serve request, inbound phone call, or outbound phone call.

14. The computer-implemented method of claim 1, further comprising:
filtering the collection of items based on the history information; and
storing, on a non-transitory storage medium, the message action and at least one of the collection of items based on the ranking as the history information.

15. The computer-implemented method of claim 1, wherein ranking the collection of items based on the one or more attributes comprises:
training a machine learning algorithm using the history information and the message action;
ranking the collection of items using the machine learning algorithm;
receiving feedback on customer action generated by the transmitted message; and
validating the machine learning algorithm based on the feedback.

16. The computer-implemented method of claim 1, wherein the message recipe comprises one or more quotas.

17. The computer-implement method of claim 1, wherein the message comprises an item substitution for one or more of the of the collection of items.

18. A computer-implemented system comprising:
a processor configured for:
collecting history information, wherein the history information comprises one or more episodes from one or more customers, wherein each episode comprises one or more items of a collection of items;
transforming the history information into standardized attribute information comprising one or more attributes comprising a matrix of observed substitutions, wherein an observed substitution comprises an alternative item;
training a neural network on the matrix of observed substitutions to generate item embeddings receiving input comprising an item, wherein the neural network comprises a loss function for optimizing a machine learning algorithm;
identifying a substitution similarity between the item and another item based on the item embeddings;
automatically generating a message comprising at least one item of the collection of items based on a subset of the one or more attributes; and
transmitting the message to the one or more customers over a network;
wherein automatically generating a message based on the subset of the one or more attributes further comprises:
defining a message recipe based on the subset of the one or more attributes;
ranking the collection of items based on a subset of the one or more attributes;
defining a message action based on the message recipe and a message template; and
automatically generating the message comprising the message action and the at least one item of the collection of items based on the ranking.

19. The computer-implemented system of claim 18, wherein the processor is further configured for:
filtering the collection of items based on the substitution similarity.

20. The computer-implemented system of claim 18, wherein the one or more attributes further comprise a category.

21. The computer-implemented system of claim 18, wherein the one or more attributes further comprise a price.

22. The computer-implemented system of claim 21, wherein the price comprises a discount.

23. The computer-implemented system of claim 18, wherein the one or more attributes further comprise a discovery score configured to score an affinity level for the customer for each of the collection of items.

24. The computer-implemented system of claim 23, wherein the processor is further configured for:
determining the discovery score using collaborative filtering.

25. The computer-implemented system of claim 18, wherein the one or more attributes further comprise a popularity score of the collection of items.

26. The computer-implemented system of claim 25, wherein the popularity score is specific to one or more stores the customer has a shopping history.

27. The computer-implemented system of claim 18, wherein the one or more attributes further comprise a repurchase score.

28. The computer-implemented system of claim 18, wherein the one or more attributes further comprise a random element.

29. The computer-implemented system of claim 18, wherein ranking the collection of items based on a subset of the one or more attributes further comprises selecting a product quota based on the ranking of at least one attribute.

30. The computer-implemented system of claim 18, wherein transmitting the message to the one or more customers comprises at least one of transmitting an email, SMS message, application push, webpage push, webpage serve request, inbound phone call, or outbound phone call.

31. The computer-implemented system of claim 18, wherein the processor is further configured for:
   filtering the collection of items based on the history information; and
   storing, on a non-transitory storage medium, the message action and at least one of the collection of items based on the ranking as the history information.

32. The computer-implemented system of claim 18, wherein ranking the collection of items based on the one or more attributes comprises:
   training a machine learning algorithm using the history information and the message action;
   ranking the collection of items using the machine learning algorithm;
   receiving feedback on customer action generated by the transmitted message; and
   validating the machine learning algorithm based on the feedback.

33. The computer-implemented system of claim 18, wherein the message recipe comprises one or more quotas.

34. The computer-implement system of claim 18, wherein the message comprises an item substitution for one or more of the of the collection of items.

\* \* \* \* \*